United States Patent
Izumi et al.

(10) Patent No.: US 6,778,475 B2
(45) Date of Patent: Aug. 17, 2004

(54) OPTICAL DETECTOR, OPTICAL PICKUP AND OPTICAL INFORMATION REPRODUCING APPARATUS USING OPTICAL PICKUP FOR DETECTING AT LEAST THREE LIGHT BEAMS SEPARATED FROM ONE OR MORE LIGHT SOURCES

(75) Inventors: Katsuhiko Izumi, Chigasaki (JP); Kunikazu Ohnishi, Yokosuka (JP); Kenichi Shimada, Yokohama (JP); Masayuki Inoue, Yokohama (JP); Shinji Fujita, Hitachinaka (JP)

(73) Assignees: Hitachi, Ltd., Tokyo (JP); Hitachi Media Electronics Co., Ltd., Mizusawa (JP)

( * ) Notice: Subject to any disclaimer, the term of this patent is extended or adjusted under 35 U.S.C. 154(b) by 0 days.

(21) Appl. No.: 10/294,943

(22) Filed: Nov. 15, 2002

(65) Prior Publication Data

US 2003/0072228 A1 Apr. 17, 2003

Related U.S. Application Data

(63) Continuation of application No. 09/726,557, filed on Dec. 1, 2000, now Pat. No. 6,567,355.

(30) Foreign Application Priority Data

Dec. 3, 1999 (JP) .............................. 11-344238

(51) Int. Cl.$^7$ ............................................. G11B 7/00
(52) U.S. Cl. ............................ 369/44.41; 369/120
(58) Field of Search ....................... 369/44.23, 44.26, 369/44.27, 44.29, 44.35, 44.37, 44.41, 53.2, 53.22, 53.23, 120, 121

(56) References Cited

U.S. PATENT DOCUMENTS

| | | | |
|---|---|---|---|
| 5,708,636 A | 1/1998 | Takahashi et al. | 369/44.41 |
| 6,084,843 A | 7/2000 | Abe et al. | 369/44.23 |
| 6,366,543 B2 | 4/2002 | Uemura et al. | 369/44.29 |

FOREIGN PATENT DOCUMENTS

| | | |
|---|---|---|
| JP | 8-55363 | 2/1996 |
| JP | 9-54977 | 2/1997 |
| JP | 10-124903 | 5/1998 |
| JP | 10-283652 | 10/1998 |
| JP | 11-149657 | 6/1999 |
| JP | 11-171844 | 6/1999 |
| JP | 2000-222769 | 8/2000 |

OTHER PUBLICATIONS

Development of Laser Having Two Wavelengths Accelerated by Effects of 'Play Station 2', Nikkei Electronics, Nov. 29, 1999, No. 758, pp. 43–50 and partial translation.

*Primary Examiner*—Paul W. Huber
(74) *Attorney, Agent, or Firm*—Antonelli, Terry, Stout & Kraus, LLP

(57) ABSTRACT

An optical pickup has a semiconductor laser having two laser sources of different wavelengths disposed in the same package, one diffraction grating and one optical detector. A plurality of light reception areas each having four divisional light reception planes of a ⊞-character shape are disposed at positions where light beams reflected from an optical disc are applied. A focus error signal is generated by an astigmatism method by using independently these light reception areas and a tracking error signal is generated by a differential phase detection method by using one or both the light reception areas.

7 Claims, 36 Drawing Sheets

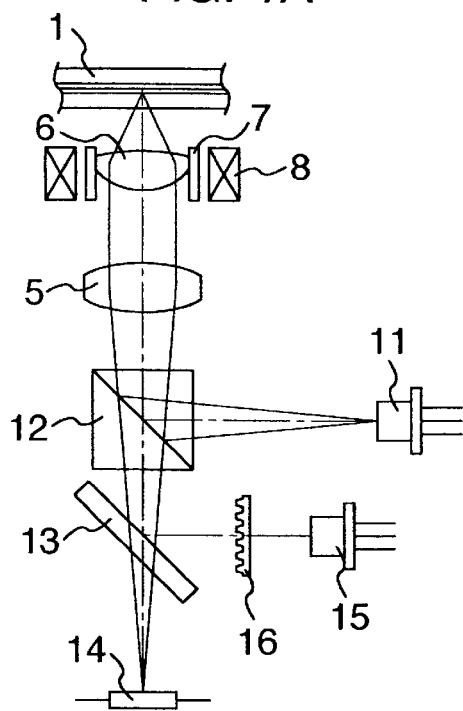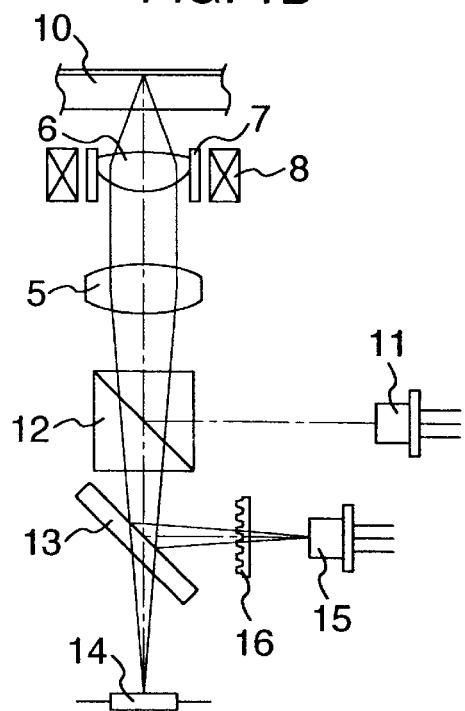

LIGHT FLUX OF
LIGHT SPOT 101
REFLECTED
FROM DISC

LIGHT FLUX OF
LIGHT SPOT 100
REFLECTED
FROM DISC

LIGHT FLUX OF
LIGHT SPOT 102
REFLECTED
FROM DISC

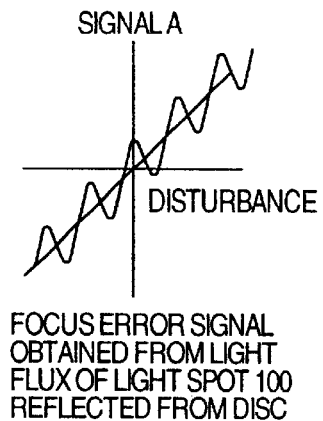
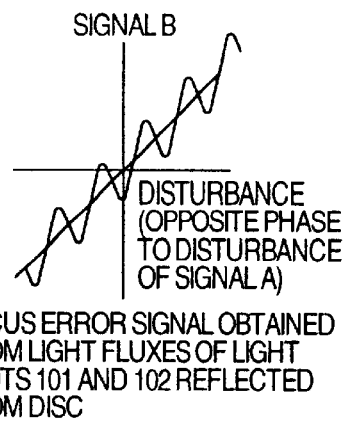
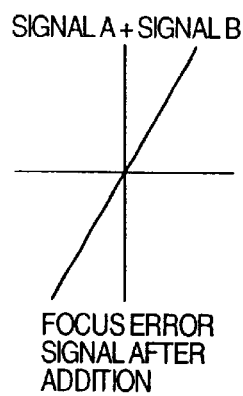
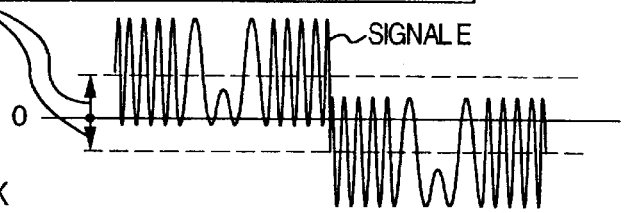
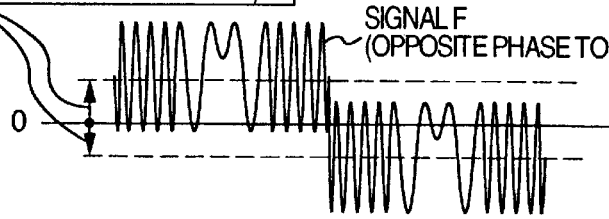
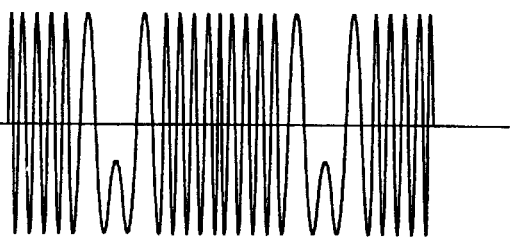

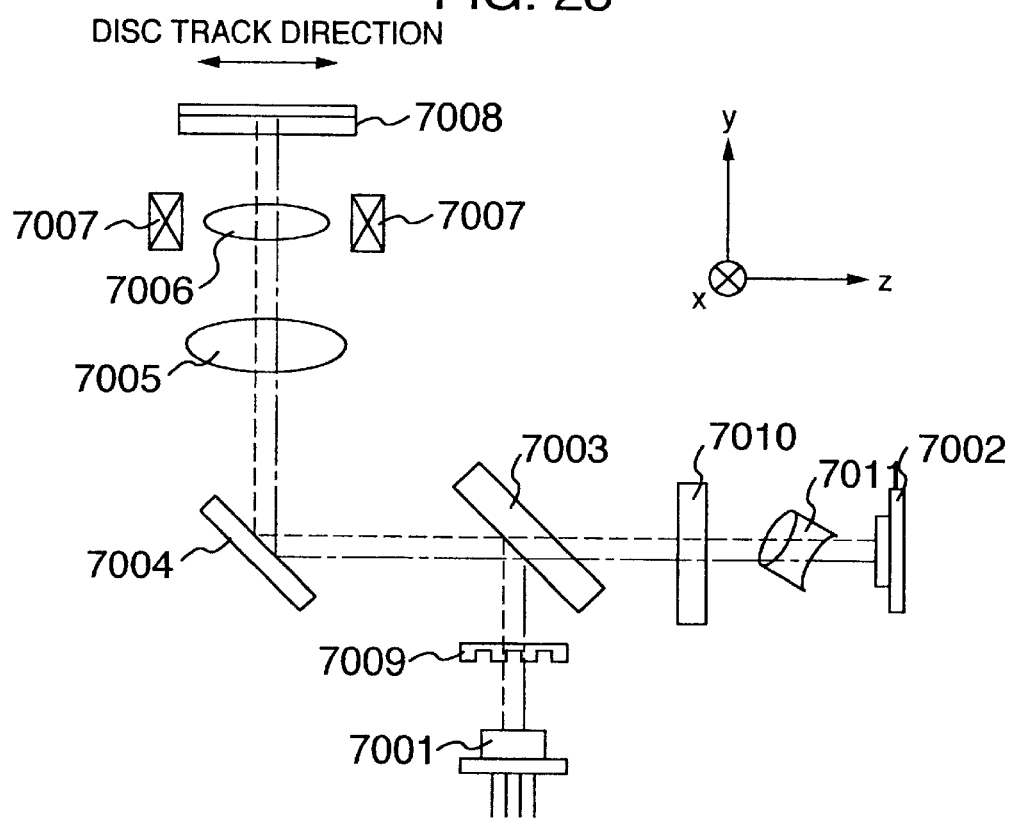

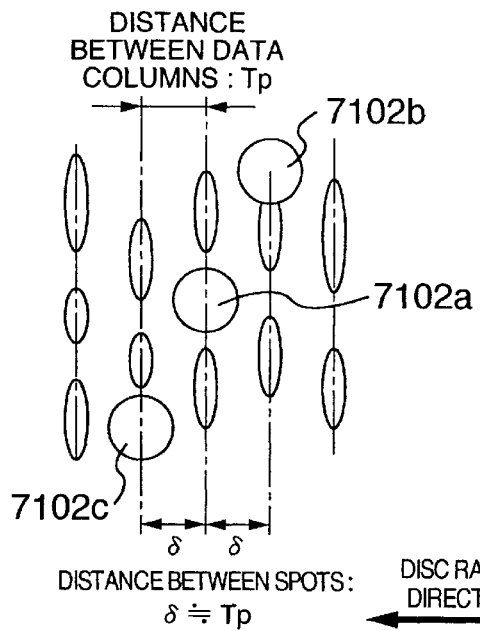

FIG. 24A

DISTANCE BETWEEN DATA COLUMNS : Tp

DISTANCE BETWEEN SPOTS: $\delta \fallingdotseq Tp$

DURING REPRODUCTION OF DVD-ROM (ILLUMINATION OF LIGHT BEAM IN 650 nm WAVELENGTH BAND)

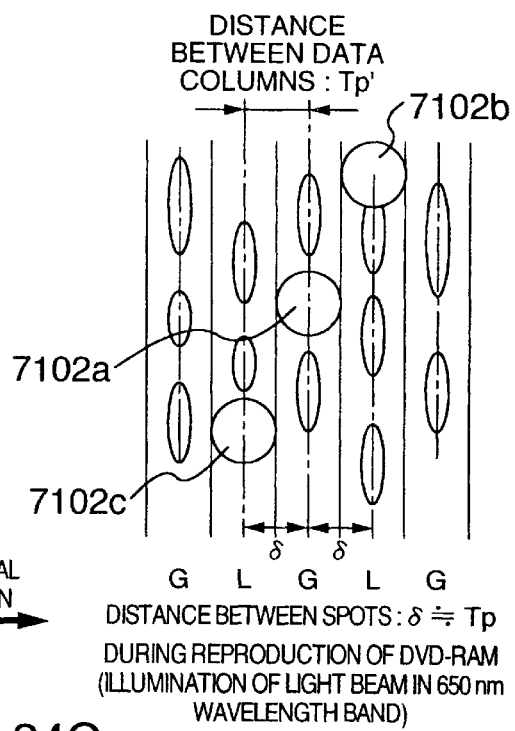

FIG. 24B

DISTANCE BETWEEN DATA COLUMNS : Tp'

G L G L G

DISTANCE BETWEEN SPOTS: $\delta \fallingdotseq Tp$

DURING REPRODUCTION OF DVD-RAM (ILLUMINATION OF LIGHT BEAM IN 650 nm WAVELENGTH BAND)

DISC RADIAL DIRECTION

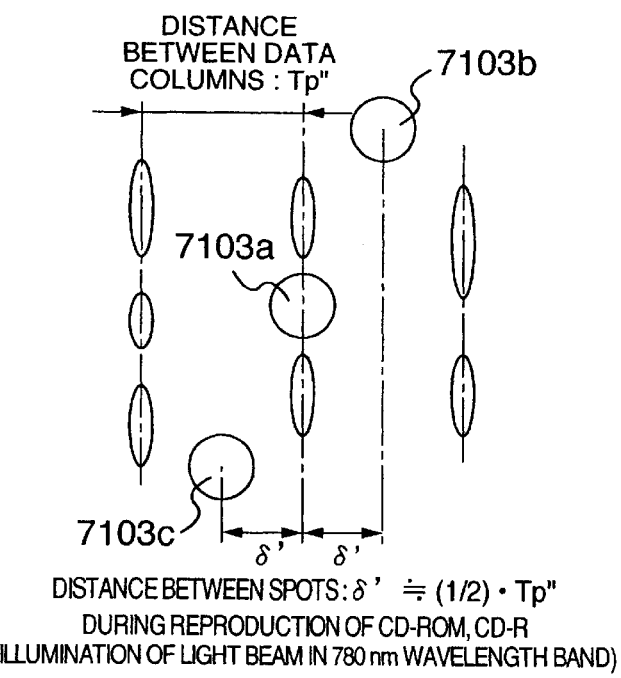

FIG. 24C

DISTANCE BETWEEN DATA COLUMNS : Tp"

DISTANCE BETWEEN SPOTS: $\delta' \fallingdotseq (1/2) \cdot Tp''$

DURING REPRODUCTION OF CD-ROM, CD-R (ILLUMINATION OF LIGHT BEAM IN 780 nm WAVELENGTH BAND)

DURING REPRODUCTION
OF DVD-ROM, DVD-RAM
(ILLUMINATION OF LIGHT BEAM
IN 650 nm WAVELENGTH BAND)

DURING REPRODUCTION
OF CD-ROM, CD-R
(ILLUMINATION OF LIGHT BEAM
IN 780 nm WAVELENGTH BAND)

FIG. 29A
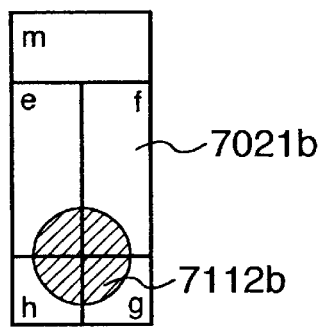
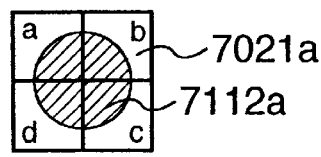
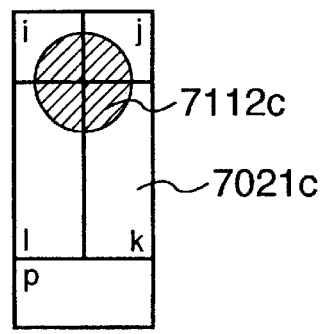
DURING REPRODUCTION
OF DVD-ROM, DVD-RAM
(ILLUMINATION OF LIGHT BEAM
IN 650 nm WAVELENGTH BAND)
FIG. 29B
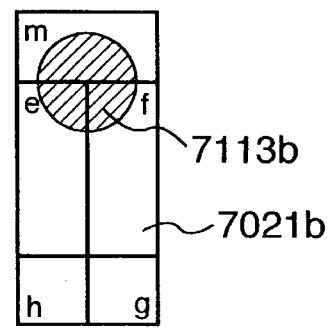
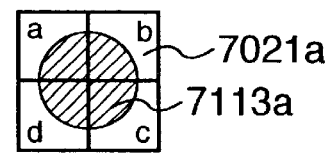
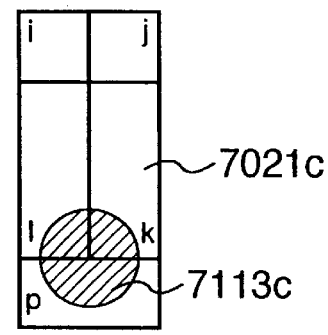
DURING REPRODUCTION
OF CD-ROM, CD-R
(ILLUMINATION OF LIGHT BEAM
IN 780 nm WAVELENGTH BAND)

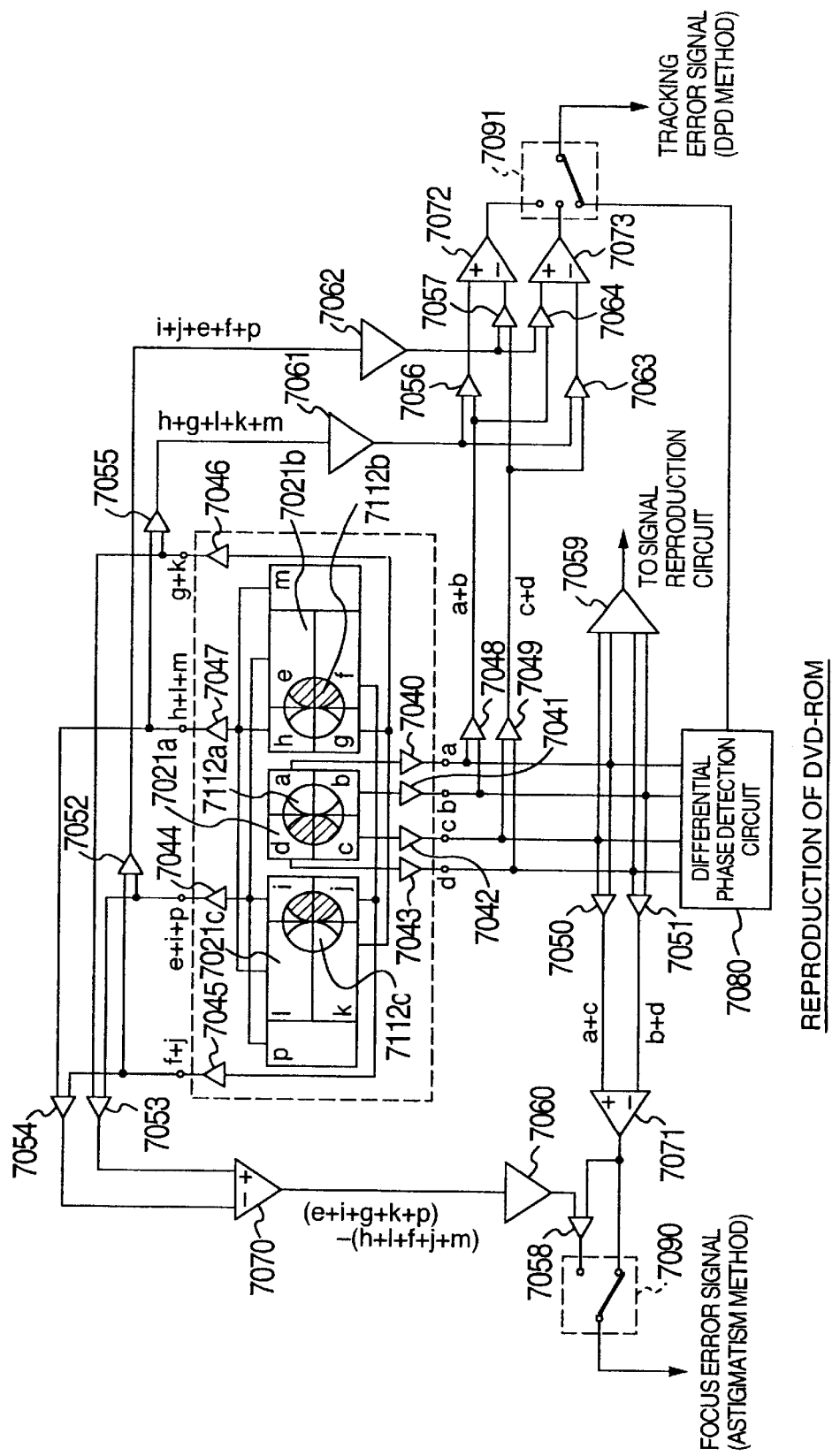

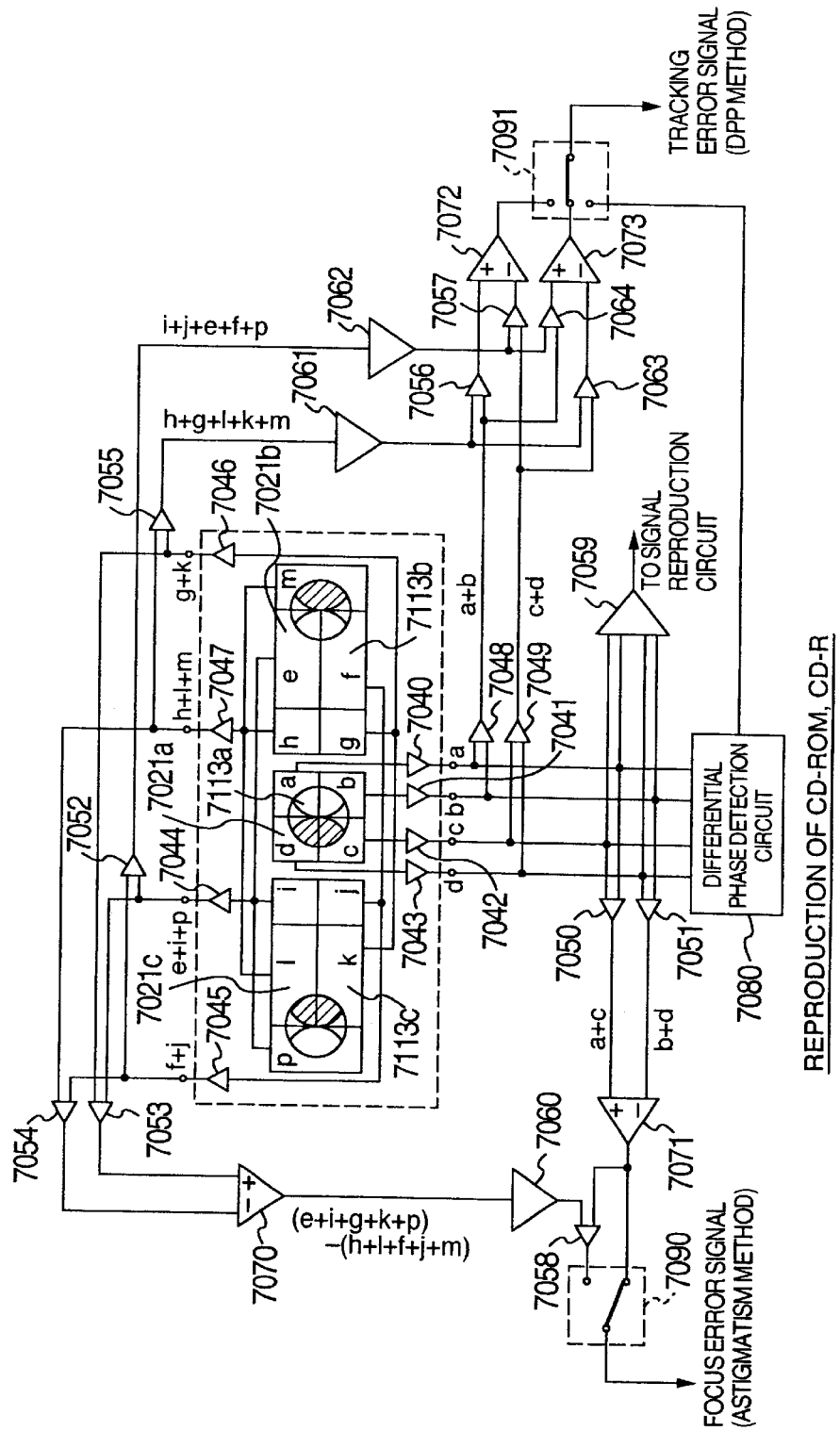

FIG. 33A
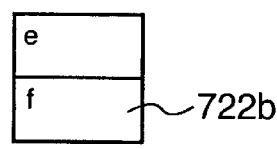
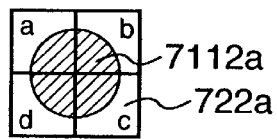
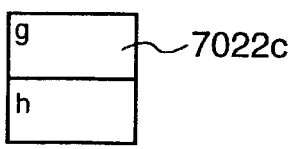
DURING REPRODUCTION
OF DVD-ROM
(ILLUMINATION OF LIGHT BEAM
IN 650 nm WAVELENGTH BAND)
FIG. 33B
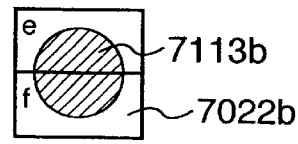
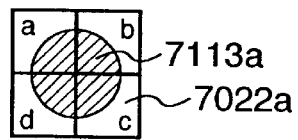
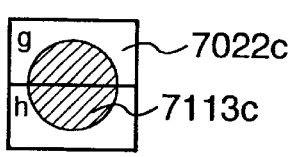
DURING REPRODUCTION
OF CD-ROM, CD-R
(ILLUMINATION OF LIGHT BEAM
IN 780 nm WAVELENGTH BAND)

FIG. 36A
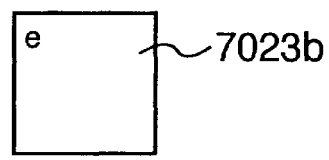
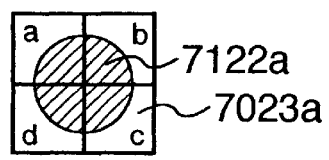
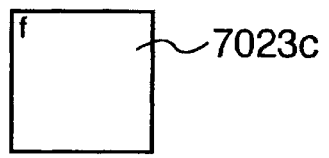
DURING REPRODUCTION
OF DVD-ROM
(ILLUMINATION OF LIGHT BEAM
IN 650 nm WAVELENGTH BAND)
FIG. 36B
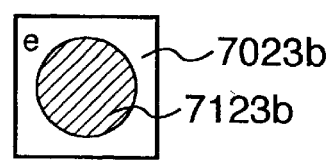
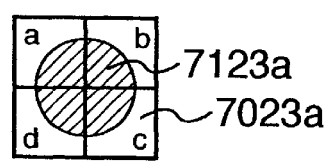
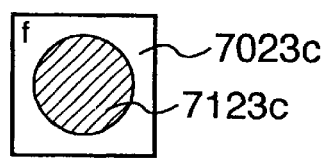
DURING REPRODUCTION
OF CD-ROM, CD-R
(ILLUMINATION OF LIGHT BEAM
IN 780 nm WAVELENGTH BAND)

WITH SLANTED SIDE WALLS

WITH STEPPED SIDE WALLS

INCIDENT LIGHT

OPTICAL DETECTOR, OPTICAL PICKUP AND OPTICAL INFORMATION REPRODUCING APPARATUS USING OPTICAL PICKUP FOR DETECTING AT LEAST THREE LIGHT BEAMS SEPARATED FROM ONE OR MORE LIGHT SOURCES

This is a continuation of application Ser. No. 09/726,557, filed Dec. 1, 2000, now U.S. Pat. No. 6,567,355, the entire disclosure of which is hereby incorporated by reference.

BACKGROUND OF THE INVENTION

The present invention relates to an optical detector, an optical pickup, and an optical information reproducing apparatus (hereinafter described as an optical disc drive) using an optical pickup, capable of reproducing an information signal recorded in an optical information recording medium (hereinafter described as an optical disc).

There are various types of optical discs having different substrate thicknesses and using different wavelengths. For example, discs such as CD and CD-R have a substrate thickness of 1.2 mm and use a 780 nm band as an optimum recording/reproducing laser wavelength, whereas recently standardized discs such as DVD-ROM and DVD-RAM have a substrate thickness of 0.6 mm and use a 650 nm band as an optimum recording/reproducing laser wavelength. Optical disc drives using a laser beam having a wavelength shorter than conventionally used wavelengths have been proposed as well. Under such circumstances, the main trend of, for example, optical pickups for DVD prevailing nowadays, is to mount semiconductor lasers having two different wavelengths in 780 nm and 650 nm bands in order to be compatible with CD optical discs already widely used.

Wide use of such optical discs is forcing optical disc drives to be compact and inexpensive. Techniques of making optical pickups compact and simple are therefore essential. Effective means for compact and simple optical pickups are to reduce the number of components of an optical system, to configure an optical pickup with inexpensive components, or the like. If an optical disc drive is to be made compatible with a plurality type of optical discs, an optical system characteristic to each type of the optical disc is required. In this case, simplifying an optical system and reducing the number of components of an optical system by using common optical elements is effective for making an optical pickup compact and inexpensive. JP-A-8-55363 and JP-A-9-54977 disclose the technique of guiding each of the laser beams of two semiconductor lasers into the same intermediate optical path to reproduce information recorded in a plurality type of optical discs with one objective lens.

Most of optical pickups each having two semiconductor lasers have an optical system whose converging optical elements such as an objective lens and a collimator lens are used in common in order to make an optical pickup compact and inexpensive. An example of the structure of such an optical system is shown in FIGS. 1A and 1B.

Referring to FIG. 1A, a light beam emitted from a semiconductor laser 11 oscillating at a wavelength of, for example, 650 nm, reaches a dichromatic half prism 12. The dichromatic half prism 12 is an optical element made of two prisms adhered each other, and has therein a reflection film which reflects a laser beam of 650 nm in wavelength by about 50% and transmits it by about 50%, and transmits a laser beam of 780 nm in wavelength by about 100%. The light beam emitted from the semiconductor laser 11 is reflected by the reflection film of the dichromatic half mirror 12 disposed at an angle of 45° relative to the optical axis of the semiconductor laser 11, then converted into a parallel light beam by a collimator lens 5, and reaches an objective lens 6. The objective lens 6 is integrally held by an actuator 7. By energizing a drive coil 8, the light beam can be focussed to form a light spot on a data record surface of an optical disc 1 such as DVD-ROM. A light beam reflected from the optical disc 1 propagates along a reversed optical path of the incoming optical path to reach the dichromatic half prism 12 via the objective lens 6 and collimator lens 5. About 50% of the reflected light amount transmits through the dichromatic half prism 12 and reaches a dichromatic half mirror 13. The dichromatic half mirror 13 is an optical element which transmits a laser beam of 650 nm by about 100%, and transmits a laser beam of 780 nm in wavelength by about 50% and reflects it by about 50%.

The light beam reached the dichromatic half mirror 13 transmits therethrough and thereafter is converged at a predetermined position of an optical detector 14.

Referring to FIG. 1B, a light beam emitted from a semiconductor laser 15 oscillating at a wavelength of, for example, 780 nm, transmits through a diffraction grating 16 for generating three beams and thereafter reaches the dichromatic half mirror 13 disposed at an angle of about 45° relative to the optical axis of the semiconductor laser 15. As described above, the dichromatic half mirror 12 has the characteristics that a laser beam having a 780 nm wavelength is reflected by about 50%, and the dichromatic half prism 12 has the characteristics that a laser beam having a 780 nm wavelength is transmitted by about 100%. Therefore, the light beam emitted from the semiconductor laser 15 is reflected by the dichromatic half mirror 13, transmitted through the dichromatic half prism 12, thereafter converted into a parallel light beam by the collimator lens 5, and reaches the objective lens. The objective lens 6 can focus the light beam emitted from the semiconductor laser 15 to form a light spot on a data record surface of another optical disc 10 such as CD-ROM. A light beam reflected from the optical disc 10 propagates along a reversed optical path of the incoming optical path to reach the dichromatic half mirror 13 via the objective lens 6, collimator lens 5 and dichromatic half prism 12.

Since the dichromatic half mirror 13 is an optical element transmitting about 50% of the laser beam having a 780 nm wavelength as described earlier, the light beam reached the dichromatic half mirror 13 transmits through the dichromatic half mirror 13 and thereafter is converged at a predetermined position of the optical detector 14.

In the structure of the optical system illustratively shown in FIGS. 1A and 1B, the converging optical system from the dichromatic half prism 12 to the collimator lens 5 and to the objective lens 6 is used in common so that the number of components is reduced. The dichromatic half prism and dichromatic half mirror having a selection function of two different wavelengths and predetermined optical characteristics are used, and the semiconductor lasers having two different wavelengths are used. These optical elements having the waveform selection function and the semiconductor lasers are much expensive than other components of the optical pickup, and hinder a further cost reduction of the optical pickup.

SUMMARY OF THE INVENTION

Under such circumstances, an object of the present invention is to provide an optical detector, an optical pickup, and an optical disc drive using an optical pickup capable of recording/reproducing an information signal in/from a plurality type of optical discs, in which the structure of an optical system simpler than that of a conventional optical system can be realized and a low cost optical system structure can be realized by using inexpensive optical elements and semiconductor lasers as small in number as possible.

In order to achieve this object of the invention, in an optical detector, an optical pickup and an optical information reproducing apparatus using the optical pickup, the optical information reproducing apparatus comprises: a semiconductor laser having a first laser source, a second laser source or both; a light separation element for separating a light beam emitted from the first laser source, a second laser source or both into at least three light beams; a converging optical system for applying a light beam including the three light beams to a first optical information recording medium or a second optical information recording medium different from the first optical information recording medium; an optical detector having a first light reception area disposed at a position where a light beam emitted from the first laser source and reflected from a first optical information recording medium is applied, and a second light reception area disposed at a position where a light beam emitted from the second laser source and reflected from a second optical information recording medium is applied; and a signal processing circuit for generating a focus error signal and a tracking error signal of the light spot applied to the optical information recording medium by performing a predetermined calculation of photoelectrically converted signals obtained by the optical detector and for reproducing an information signal recorded in the optical information recording medium, wherein the optical detector has the first and second light reception areas each having four divided light reception planes of a 田-character shape, and the signal processing circuit outputs a signal capable of generating the focus error signal by an astigmatism method by independently using the first or second light reception area or both and a signal capable of generating the tracking error signal by a differential phase detection method.

Further, in order to achieve this object of the invention, the optical detector further comprises a third light reception area and a fourth light reception area each having two divided light reception planes and disposed at a position where a light beam emitted from the first laser source and reflected from the first optical information recording medium is applied, wherein the signal processing circuit outputs a signal capable of generating the tracking error signal by a push-pull method by independently using the third or fourth light reception area or both.

Still further, in order to achieve this object of the invention, the optical detector further comprises a third light reception area and a fourth light reception area each disposed at a position where a light beam emitted from the first laser source and reflected from the first optical information recording medium is applied, wherein the signal processing circuit outputs a signal capable of generating the tracking error signal by a three-beam method by using the third and fourth light reception areas.

Still further, in order to achieve this object of the invention, the optical detector further comprises a third light reception area and a fourth light reception area each having four divided light reception planes of a 田-character shape and disposed at a position where a light beam emitted from the first laser source and reflected from the first optical information recording medium is applied, wherein the signal processing circuit outputs a signal capable of generating the focus error signal by the astigmatism method by independently using the third or fourth light reception area or both and a signal capable of generating the tracking error signal by the push-pull method by independently using the third or fourth light reception area or both.

Further, in order to achieve this object of the invention, the optical detector further comprises a fifth light reception area and a sixth light reception area each having two divided light reception planes and disposed at a position where a light beam emitted from the second laser source and reflected from the second optical information recording medium is applied, wherein the signal processing circuit outputs a signal capable of generating the tracking error signal by the push-pull method by independently using the fifth or sixth light reception area or both.

Still further, in order to achieve this object of the invention, the optical detector further comprises a fifth light reception area and a sixth light reception area each disposed at a position where a light beam emitted from the second laser source and reflected from the second optical information recording medium is applied, wherein the signal processing circuit outputs a signal capable of generating the tracking error signal by the three-beam method by using the fifth and sixth light reception areas.

Still further, in order to achieve this object of the invention, the optical detector further comprises a fifth light reception area and a sixth light reception area each having four divided light reception planes of a 田-character shape and disposed at a position where a light beam emitted from the second laser source and reflected from the second optical information recording medium is applied, wherein the signal processing circuit outputs a signal capable of generating the focus error signal by the astigmatism method by independently using the fifth or sixth light reception area or both and a signal capable of generating the tracking error signal by the push-pull method by independently using the fifth or sixth light reception area or both.

In order to achieve this object of the invention, the optical information reproducing apparatus comprises: a semiconductor laser having a first laser source, a second laser source or both; a light separation element for separating a light beam emitted from the first laser source, a second laser source or both into at least three light beams; a converging optical system for applying a light beam including the three light beams to a first or second optical information recording medium; an optical detector having first to third light reception areas disposed at positions where the three light beams emitted from a first laser source and reflected from a first optical information recording medium can be received independently, and fourth to sixth light reception areas disposed at positions where the three light beams emitted from a second laser source and reflected from a second optical information recording medium can be received independently; and a signal processing circuit for generating a focus error signal and a tracking error signal of the light spot applied to the first or second information recording medium by performing a predetermined calculation of photoelectrically converted signals obtained by the optical detector and for reproducing an information signal recorded in the first or second optical information recording medium, wherein the first and fourth light reception areas each have four divided light reception planes of a 田-character shape, the second, third, fifth and sixth light reception areas each have at least two divided light reception planes, and the signal processing circuit generates a focus error signal by an astigmatism method by independently using the first or fourth light reception area or both, generates a tracking error signal by a differential phase detection method by using the first or fourth light reception area or both, or generates a tracking error signal by a push-pull method by using the second, third, fifth, or sixth light reception area, or by independently using each of these areas.

In order to achieve this object of the invention, in the optical information reproducing apparatus, of a plurality of light spots applied to each of the first and second optical information recording media, at least one set of light spots has a space therebetween in a track vertical direction equal to about a half a track pitch of each of the first and second optical information recording media; and a ratio between track pitches of the first and second optical information recording media is generally equal to a ratio between wavelengths of the first and second laser sources.

The first or second laser source or both may be housed in the same package.

The signal processing circuit for generating the focus error signal and tracking error signal of a light spot applied to the optical information recording medium through a predetermined calculation of photoelectrically converted signals obtained by the optical detector, may by provided in the optical detector or optical pickup.

A method of dividing the light reception area of the optical detector into four divided light reception planes of the 田-character shape will be described. With this method, the light reception area of the optical detector is divided into four divided light reception planes by first and second division line crossing each other. The shape of the light reception area after this division takes a 田-character of kanji.

In order to achieve this object of the invention, an optical pickup or an optical information reproducing apparatus using the optical pickup comprises: a semiconductor laser having a first laser source, a second laser source or both; a light separation element for separating a light beam radiated from the first laser source, the second laser source or both into at least three light beams; a converging optical system for converging light beams including the three light beams on a first optical information recording medium or a second optical information recording medium different from the first optical information recording medium and forming independent light spots at predetermined positions of the first or second optical information recording medium; an optical detector having first and second light reception areas, the first light reception area being disposed so as to make a first position where a light beam radiated from said first laser source and reflected from the first optical information recording medium is applied, be in a light reception range, and the second light reception area being disposed so as to make a second position where a light beam radiated from said second laser source and reflected from the second optical information recording medium is applied, be in a light reception range; and a light detection optical system for guiding the light beam reflected from the first optical information recording medium or the light beam reflected from the second optical information recording medium, to a predetermined position of the optical detector.

The light detection optical system may have a function of guiding the first light beam radiated from the first semiconductor laser source and reflected from the optical information recording medium to the first light reception area disposed at the predetermined position of the optical detector and a function of guiding the second light beam reflected from the optical information recording medium to the second light reception area of the optical detector disposed at a position different from the first light reception area.

The light detection optical system may have a hologram element having a linear or curved grating groove pattern. As one example of the hologram element, the hologram element has a wavelength selectivity of not diffracting the first light beam having a predetermined wavelength and diffracting the second light beam having a wavelength different from that of the first light beam at a predetermined diffraction efficiency.

As another example of the hologram element, the hologram element has a polarization selectivity of not diffracting a light beam having a predetermined polarization direction and diffracting a light beam having a polarization direction orthogonal to the predetermined polarization direction, and is provided with a polarizer element disposed in an optical path of the first or second light beam radiated from the first or second semiconductor laser source, reflected from the optical information recording medium, and propagating toward the hologram element, the polarizer element giving a predetermined polarization direction not diffracted by the hologram element to the first light beam and giving a polarization direction diffracted by the hologram element to the second light beam.

The converging optical system may have a function of converging the first light beam radiated from the first semiconductor laser source and focussing it upon the first optical information recording medium having a predetermined substrate thickness and a function of converging the second light beam radiated from the second semiconductor laser source and focussing it upon the second optical information recording medium having a thickness different from the predetermined substrate thickness of the first optical information recording medium.

The optical pickup described above is characterized in that the first semiconductor laser source is a semiconductor laser source having a wavelength of 660 nm or shorter, the first optical information recording medium is an optical disc having a substrate thickness of about 0.6 mm, the second semiconductor laser source is a semiconductor laser source having a wavelength of 780 nm to 790 nm, and the second optical information recording medium is an optical disc having a substrate thickness of about 1.2 mm. The polarizer element is characterized in that it functions as a 5λ/4 plate for the first light beam radiated from the first semiconductor laser source.

In the optical pickup described above, an astigmatism method is used for detecting a focus error signal from the first light beam radiated from the first semiconductor laser source and reflected from the first optical information recording medium, an astigmatism method, knife edge method or beam size method is used for detecting a focus error signal from the second light beam radiated from the second semiconductor laser source and reflected from the second optical information recording medium, a differential phase detection method or differential push-pull method (DPP method) is used for detecting a tracking error signal from the first light beam radiated from the first semiconductor laser source and reflected from the first optical information recording medium, and a push-pull method, differential push-pull method or three-spot method is used for detecting a tracking error signal from the second light beam radiated from the second semiconductor laser source and reflected from the second optical information recording medium.

For the differential push-pull method for detecting the tracking error signal of the second optical information recording medium, a three-spot diffraction grating is provided which diffracts and separates the second light beam radiated from the second semiconductor laser source into at least three light beams and sets the distance between the three light beams to about a half of the track pitch of information tracks of the second optical information recording medium along the radial direction of the second optical recording medium. The three-spot diffraction grating also diffracts and separates the second light beam radiated from the second semiconductor laser source into at least three light beams and sets the distance between the three light beams to about a half of the pitch of grooves preformed in a predetermined write-once or rewritable optical information recording medium along the radial direction of the first optical recording medium.

By adjusting the position of the light detection optical system, the positions of the light reception areas of the optical detector where the first or second light beam reflected from the optical information recording medium is applied, can be adjusted.

By adjusting the position of the light detection optical system, the positions of the light reception areas of the optical detector where the first or second light beam reflected from the optical information recording medium is applied, can be made linear.

By adjusting the position of the light detection optical system, the positions of the light reception areas of the optical detector where the first or second light beam reflected from the optical information recording medium is applied, can be made coincident.

An optical pickup or an optical information reproducing apparatus of this invention comprises: a semiconductor laser having a first laser source, a second laser source or both; a light separation element for separating a light beam radiated from the first laser source, the second laser source or both into at least three light beams; a converging optical system for converging light beams including the three light beams on a first optical information recording medium or a second optical information recording medium different from the first optical information recording medium and forming independent light spots at predetermined positions of the first or second optical information recording medium; an optical detector having first and second light reception areas, the first light reception area being disposed so as to make a first position where a light beam reflected from the first optical information recording medium is applied, be in a light reception range, and the second light reception area being disposed so as to make a second position where a light beam reflected from the second optical information recording medium is applied, be in a light reception range; and a light detection optical system for guiding the light beam reflected from the first optical information recording medium or the light beam reflected from the second optical information recording medium, to a predetermined position of the optical detector.

In the optical pickup, the light detection optical system may guide the light beam reflected from the first optical information recording medium or the light beam reflected from the second optical information recording medium to the optical detector so that a relative position between the first position where the light beam reflected from the first optical information recording medium and the second position where the light beam reflected from the second optical information recording medium is changed.

In the optical pickup, the light detection optical system may guide the light beam reflected from the first optical information recording medium or the light beam reflected from the second optical information recording medium to the optical detector so that the first light reception area disposed so as to make the first position where the light beam reflected from the first optical information recording medium is applied, be in the light reception range, is disposed at a position different from the second light reception area disposed so as to make the second position where the light beam reflected from the second optical information recording medium is applied, be in the light reception range.

In the optical pickup, the light detection optical system may guide the light beam reflected from the first optical information recording medium or the light beam reflected from the second optical information recording medium to the optical detector so that the first and second light reception areas are disposed linearly by changing a relative position between the first position where the light beam reflected from the first optical information recording medium and the second position where the light beam reflected from the second optical information recording medium.

In the optical pickup, the light detection optical system may guide the light beam reflected from the first optical information recording medium or the light beam reflected from the second optical information recording medium to the optical detector so that the first and second light reception areas are disposed at a same position by changing a relative position between the first position where the light beam reflected from the first optical information recording medium and the second position where the light beam reflected from the second optical information recording medium.

As described above, according to the present invention, the structure of the optical system of an optical pickup has a semiconductor laser with two laser sources having different wavelengths, at least one diffraction grating, and one optical detector. With this optical pickup, a focus error signal and a tracking error signal can be generated which are necessary for reproduction or record of various types of optical discs such as DVD-ROM, DVD-RAM and CD-ROM having different substrate thicknesses and groove structures. If the ratio between two laser wavelengths is approximately equal to the ratio between intervals of tracks of optical discs, the optical system requires only one diffraction grating and the wavelength characteristics and the polarization characteristics specific to optical components including the diffraction grating and half mirror are not required. Accordingly, the optical system simpler and more inexpensive than a conventional system can be realized.

If the two-wavelength multi laser is used as the light source of the optical pickup, the diffraction grating of this invention allows the light reception areas of the optical detector to be used in common for the two wavelengths. Therefore, information of a plurality type of optical discs can be reproduced by using one objective lens and one light detection optical system. The number of components can be reduced so that the optical pickup can be made more compact, simplified and more inexpensive.

BRIEF DESCRIPTION OF THE DRAWINGS

FIGS. 1A and 1B are schematic diagrams showing an example of the structure of an optical pickup.

FIGS. 7A, 7B and 7C are diagrams illustrating disturbance applied to a focus error signal.

FIGS. 8A, 8B and 8C are diagrams showing a tracking error signal obtained by a push-pull arrangement.

FIG. 23 is a schematic diagram showing an optical pickup according to a seventh embodiment of the invention.

FIG. 24A is a diagram showing the positions of light spots on a DVD-ROM disc.

FIG. 24B is a diagram showing the positions of light spots on a DVD-RAM disc.

FIG. 24C is a diagram showing the positions of light spots on a CD-ROM or CD-R disc.

FIG. 29A shows a light reception plane pattern of light reception areas of an optical detector according to an eighth embodiment (during DVD reproduction).

FIG. 29B shows a light reception plane pattern of light reception areas of an optical detector according to the eighth embodiment (during CD reproduction).

FIG. 30 is a schematic diagram of a signal processing circuit used for DVD-ROM reproduction according to an eighth embodiment.

FIG. 32 is a schematic diagram of a signal processing circuit used for CD-ROM or CD-R reproduction according to the eighth embodiment.

FIG. 33A shows a light reception plane pattern of light reception areas of an optical detector according to a ninth embodiment (during DVD reproduction).

FIG. 33B shows a light reception plane pattern of light reception areas of an optical detector according to the ninth embodiment (during CD reproduction).

FIG. 36A shows a light reception plane pattern of light reception areas of an optical detector according to a tenth embodiment (during DVD reproduction).

FIG. 36B shows a light reception plane pattern of light reception areas of an optical detector according to the tenth embodiment (during CD reproduction).

DETAILED DESCRIPTION OF THE EMBODIMENTS

The structure and operation of an optical pickup according to the first embodiment of the invention will be described with reference to the accompanying drawings.

Figure 2A:
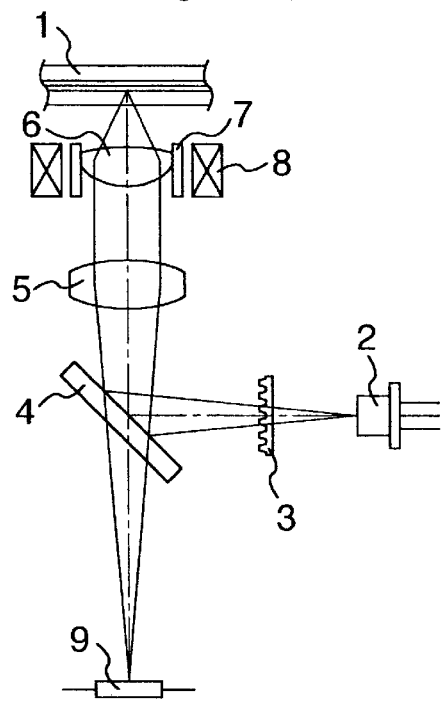
FIGS. 2A and 2B are schematic diagrams showing the structure of an optical pickup according to a first embodiment of the invention.

Referring to FIG. 2A, a semiconductor laser 2 has a laser source oscillating at a wavelength of, for example, 650 nm and a laser source oscillating at a wavelength of, for example, 780 nm, respectively housed in the same package (two-wavelength multi laser). Two laser sources are disposed at a predetermined distance d. FIG. 2A shows the active state of the laser source of 650 nm of the semiconductor laser 2. A light beam emitted from the laser source of 650 nm transmits through a diffraction grating 3 and reaches a half mirror 4. The light beam transmitted through the diffraction grating 3 is separated by diffraction grooves formed on the diffraction grating 3 into at least three light beams including a 0-order light beam without being diffracted and ±first-order diffracted light beams propagating at a predetermined diffraction angle from the 0-order light beam. The half mirror 4 is disposed at an angle of 45° relative to the optical axis of the light beam. The half mirror 4 is an optical element having a reflection film formed on the surface of the half mirror 4, which element reflects about 50% of the laser beam of 650 nm and transmits about 50% at the same time. After the light beam is reflected at the reflection film of the half mirror 4 disposed at an angle of 45° relative to the optical axis of the light beam, it is converted into a parallel light beam by a collimator lens 5 and reaches an objective lens 6. The objective lens 6 can converge a light beam at optical discs having different substrate thicknesses corresponding to the laser beams of 650 nm and 780 nm. The objective lens 6 is integrally held by an actuator 7. By energizing a drive coil 8, the light beam can be focussed to form three light spots including a 0-order light beam and ±first-order diffracted light beams on the data record surface of an optical disc 1 having a substrate thickness of 0.6 mm such as DVD-ROM and DVD-RAM. A light beam reflected from the optical disc 1 propagates along a reversed optical path of the incoming optical path to reach the half mirror 4 via the objective lens 6 and collimator lens 5. About 50% of the reflected light amount transmits through the half mirror 4 and is focussed at a predetermined position of an optical detector 9.

Figure 2B:
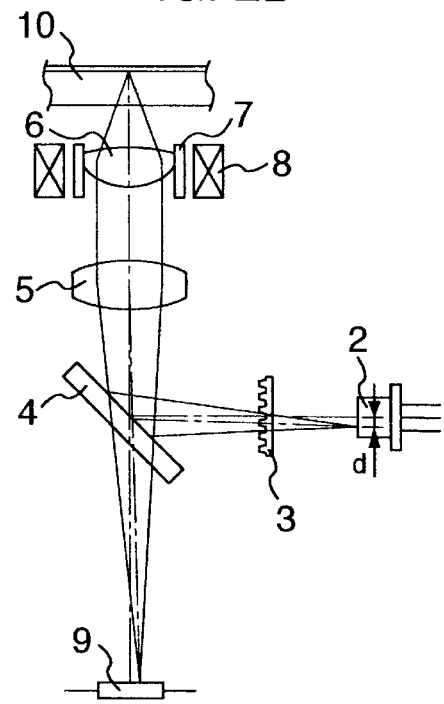

FIG. 2B shows the active state of the laser source of 780 nm in the semiconductor laser 2. A light beam emitted from the laser source of 780 nm disposed at the predetermined distance d from the laser source of 650 nm, transmits through the diffraction grating 3 and reaches the half mirror 4. The light beam transmitted through the diffraction grating 3 is separated by the diffraction grooves formed on the diffraction grating 3 into at least three light beams including a 0-order light beam and ± first-order diffracted light beams. The half mirror 4 is disposed at the angle of 45° relative to the optical axis of the light beam. The half mirror 4 is an optical element having the reflection film formed on the surface of the half mirror 4, which element also reflects about 50% of the laser beam of 780 nm and transmits about 50% at the same time.

After the light beam is reflected at the reflection film of the half mirror 4 disposed at the angle of 45° relative to the optical axis of the light beam, it is converted into a parallel light beam by the collimator lens 5 and reaches the objective lens 6. The objective lens 6 is integrally held by the actuator 7. By energizing a drive coil 8, the light beam can be focussed to form three light spots including a 0-order light beam and ± first-order diffracted light beams on the data record surface of an optical disc 10 having a substrate thickness of 1.2 mm such as CD-ROM and CD-R.

A light beam reflected from the optical disc 10 propagates along a reversed optical path of the incoming optical path to reach the half mirror 4 via the objective lens 6 and collimator lens 5. About 50% of the reflected light amount transmits through the half mirror 4 and is focussed at a predetermined position of the optical detector 9.

Figure 3:
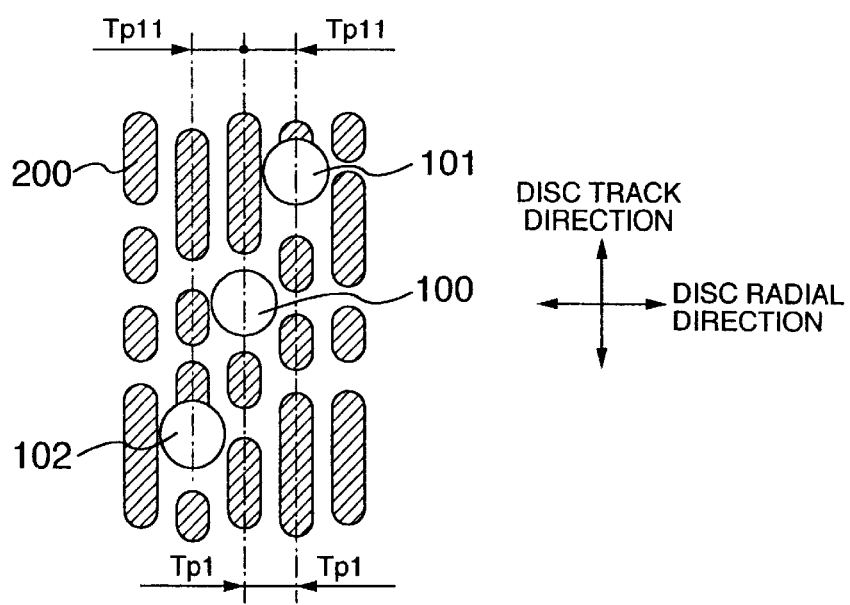
FIG. 3 is a diagram showing the positions of spots on a DVD-ROM disc according to the first embodiment of the invention.
Figure 4:
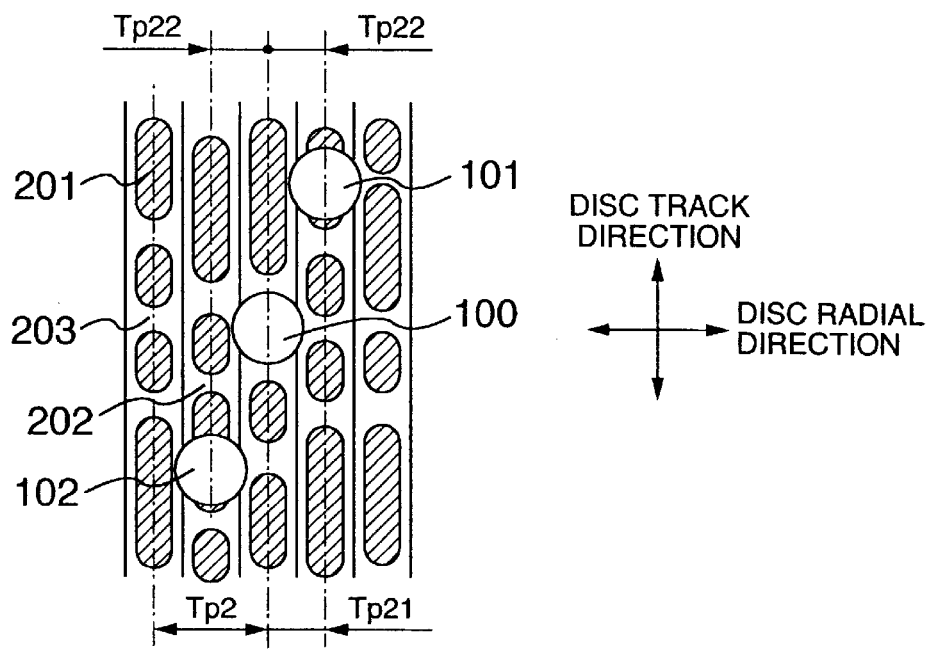
FIG. 4 is a diagram showing the positions of spots on a DVD-RAM disc according to the first embodiment of the invention.
Figure 5:
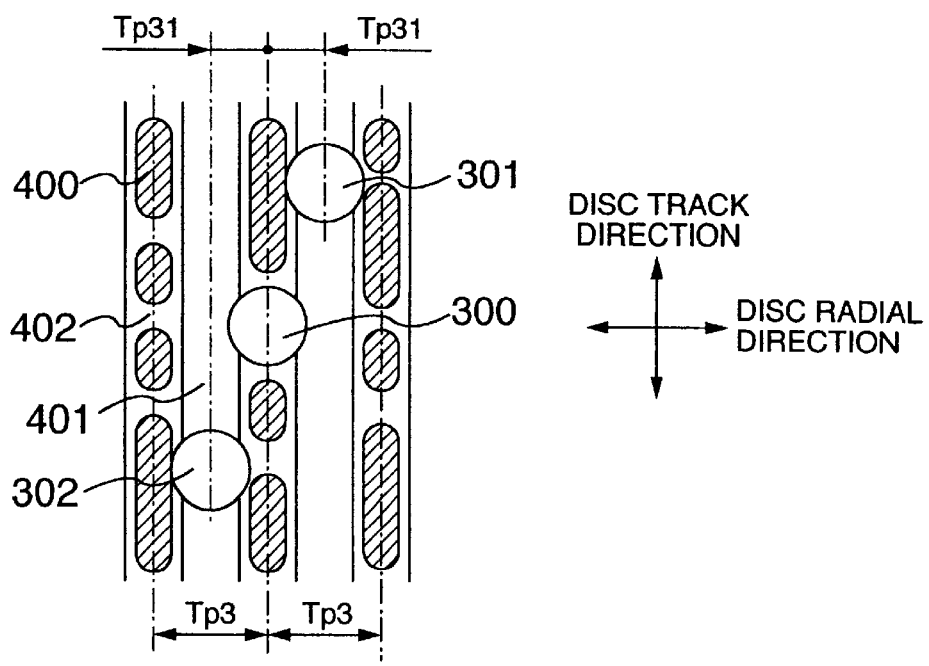
FIG. 5 is a diagram showing the positions of spots on a CD-R disc according to the first embodiment of the invention.

FIGS. 3 to 5 show the positions of spots on optical discs according to the first embodiment of the invention. FIG. 3 shows the positions of spots on a DVD-ROM disc, FIG. 4 shows the positions of spots on a DVD-RAM disc, and FIG. 5 shows the positions of spots on a CD-R disc.

Referring to FIG. 3, record pits 200 are disposed on a DVD-ROM disc along a disc track direction at the interval of a track pitch Tp1 (0.74 µm). As described with reference to FIGS. 2A and 2B, the light beam is separated by the diffraction grating 3 into three light spots on the optical disc including a 0-order light spot and ± first-order light spots. The 0-order light spot 100, + first-order diffracted light spot 101 and −first-order diffracted light spot 102 are disposed on the optical disc 1 at a space Tp11 corresponding to the track pitch Tp1 as shown in FIG. 3.

Referring to FIG. 4, guide grooves 202 are disposed on a DVD-RAM disc at the interval of a track pitch TP2 (1.48 µm), alternately with inter-guide grooves 203. Record marks 201 are disposed on the optical disc at the interval Tp21 (0.74 µm) corresponding to a half of Tp2 along the disc track direction. Similar to FIG. 3, the light beam is diffracted by the diffraction grating 3 into three light spots on the optical disc including a 0-order light spot and ± first-order light spots. The 0-order light spot 100, + first-order diffracted light spot 101 and − first-order diffracted light spot 102 are disposed on the optical disc 1 at a space Tp22 (=Tp11) corresponding to about a half of the track pitch Tp2 as shown in FIG. 4.

Referring to FIG. 5, guide grooves 401 are disposed on a CD-R disc at the interval of a track pitch TP3 (1.6 µm), alternately with inter-guide grooves 402. Record marks 400 are disposed on the guide grooves 401 at the track pitch Tp3 along the disc track direction. Similar to FIGS. 3 and 4, light spots on the optical disc 10 include three light spots, a 0-order light spot and ± first-order light spots. The 0-order light spot 100, + first-order diffracted light spot 101 and − first-order diffracted light spot 102 are disposed on the optical disc 10 at a space Tp31 corresponding to about a half of the track pitch Tp3 as shown in FIG. 5.

There is the relation that the diffraction angle of a laser beam by a diffraction grating is approximately proportional to the wavelength under the condition that the diffraction angle is small. Therefore, in the first embodiment, the distance between three spots on an optical disc is approximately proportional to the wavelength. In addition, the direction of a train of light spots on an optical disc, i.e., the diffraction direction of a light beam, does not change with the wavelength. Therefore, the distance between spots on an optical disc along a disc radial direction is also approximately proportional to the wavelength. Namely, the following relation is satisfied between the two wavelengths $\lambda 1$ (=650 nm) and $\lambda 2$ (=780 nm) and the two spot spaces Tp22 and Tp31:

$$Tp22 = Tp31 \times \lambda 1 / \lambda 2 \qquad (1)$$

According to this formula (1), if the spot space Tp31 on a CD-ROM disc is set to 0.80 μm, the spot space Tp22 on a DVD-RAM disc is 0.67 μm. This position is displaced by about 10% from 0.74 μm which is a half of the track pitch of the DVD-RAM disc, and a servo signal can be detected from the DVD-RAM disc without any problem by a servo signal detection method to be described later. Conversely, if the spot space Tp22 on a DVD-RAM disc is set to 0.74 μm, the spot space Tp31 on a CD-R disc is 0.89 μm. This position is displaced by about 10% from 0.8 μm which is the track pitch of the CD-R, and a servo signal can be detected from the CD-R disc without any problem by the servo signal detection method to be described later. An optical disc used as a standard for setting the spot space can therefore be selected as desired.

The optical detector 9 shown in FIGS. 2A and 2B has, as will be later described, at least one light reception area constituted of four light reception planes in a 田-character shape relative to each laser beam having a predetermined wavelength. Each of the 0-order light beam and ± first-order diffracted light beams is converged at each light reception area so that approximately the center of each light reception area, i.e., a cross point between vertical and horizontal division lines in the light reception area becomes coincident with the intensity center of the light beam. Since each light beam is given a predetermined astigmatism when it transmits through the half mirror 4 slanted relative to the optical path, a focus error signal can be detected from the light reception area of the 田-character shape by an astigmatism method, as will be later described. Similarly, a tracking error signal can be detected from output signals from the four light reception planes, by a push-pull method or a differential phase detection method.

Figure 6A:
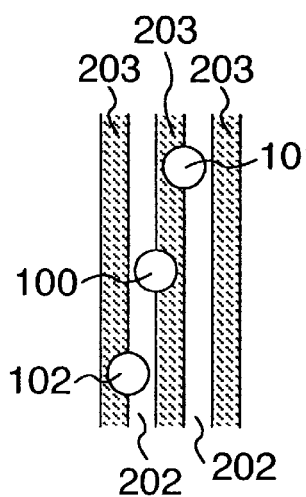
FIGS. 6A, 6B and 6C are diagrams illustrating the intensity distribution of light spots on an optical disc.
Figure 6B:
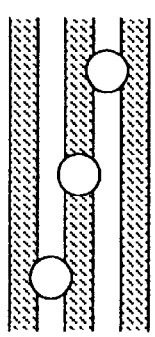
Figure 6C:
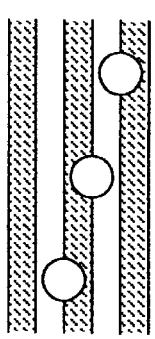

Next, the intensity distribution of light spots on the optical disc 1 will be described with reference to FIGS. 6A, 6B and 6C. In this embodiment, as shown in FIG. 4, the space between the spots 100, 101 and 102 on the optical disc 1 in the disc radial direction is set so that it becomes substantially equal to a half of the guide groove pitch of a DVD-DAM disc. The relative positions of three light spots 100, 101 and 102 on the DVD-RAM disc shown in FIGS. 6A, 6B and 6C will be described. As shown in FIG. 6B, when the 0-order light spot 100 positions just above the interguide groove 203, the + first-order diffracted light spot 101 and − first-order diffracted light spot 102 are positioned just above the adjacent guide grooves 202. Even if the positions of the light spots are displaced from the guide groove 202, the positional relation between the light spots 100, 101 and 102 is maintained unchanged as shown in FIGS. 6A and 6C. Light beams reflected from the optical disc are influenced by diffraction by the guide groove 202 and have a characteristic intensity distribution pattern periodically changing with a relative position between the positions of the light spots on the disc and the guide grooves of the disc. As shown in FIGS. 6A and 6C, the intensity distribution of reflected light beams of the 0-order light spot 100, + first-order refracted light spot and − first-order refracted light spot is in perfect bilateral symmetry.

There is the problem that a focus error signal detected from a reflected light beam by the astigmatism method is likely to have a large disturbance. The main reason for this is: the periodical change of the intensity distribution pattern of the reflected light beam caused by the above-described diffraction by the guide groove 202; and feedthrough disturbance of the push-pull signal caused by the periodical change. As shown in FIGS. 7A and 7B, although the focus error signal obtained from a light flux reflected from the light spot 100 has approximately the same waveform as that of the focus error signal obtained from a light flux reflected from each of the light spots 101 or 102, the phases of disturbances in these focus error signals are inverted almost perfectly.

If the focus error signal obtained from a light flux reflected from the light spot 100 is added to one or both of the focus error signals obtained from light fluxes reflected from the light spots 101 and 102, then a good focus error signal such as shown in FIG. 7C can be obtained which has a twofold focus error itself and the disturbance almost completely cancelled out.

Such a phenomenon also occurs when a tracking error signal is detected by the push-pull method. Generally, if the objective lens displaces in the tracking direction while a tracking error signal is detected by the push-pull method, a light spot illuminated on the light reception plane of the optical detector 9 displaces correspondingly. Therefore, as shown in FIGS. 8A and 8B, the detected tracking signal has a large off-set. This off-set has the same sign and similar levels both for the tracking signal detected from a light beam reflected from the light spot 100 and for the tracking signal detected from a light beam reflected from the light spot 101 or 102. From quite the same reason as that described with the focus error signal, the phase of the tracking signal detected from the light beam reflected from the light beam 100 is almost perfectly inverted from the phase of the tracking signal detected from a light beam reflected from the light spot 101 or 102. Therefore, the subtraction process between the tracking error signals detected from light spots reflected from the disc allows only the off-set components to be cancelled out. Therefore, as shown in FIG. 8C, a good tracking error signal can be obtained which has an off-set considerably reduced.

In the embodiments of this invention, good focus error signals and tracking error signals are detected by using the above-described principle.

Figure 9:
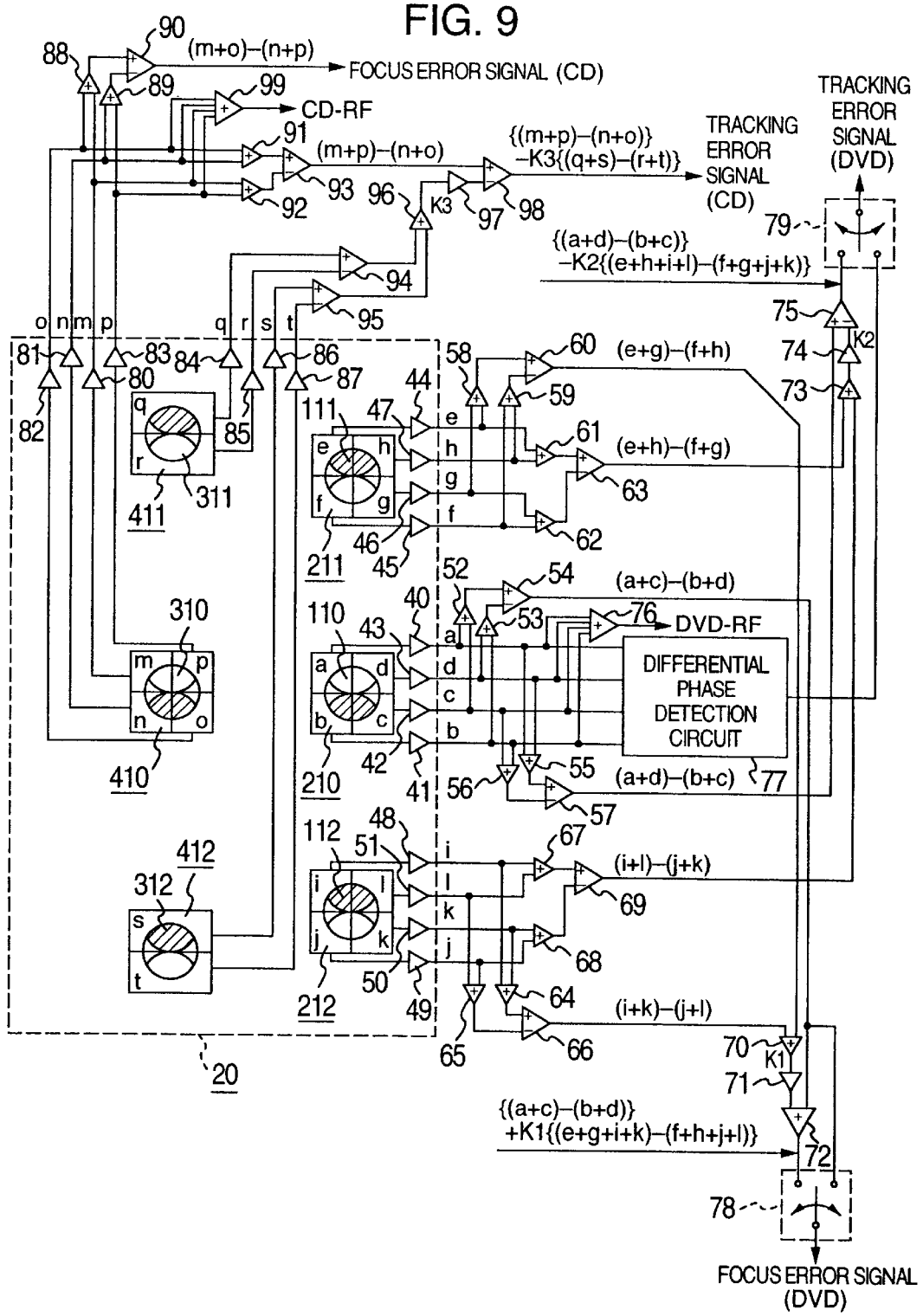
FIG. 9 shows an optical detector in a plan view and a signal processing circuit partially in a block diagram according to the first embodiment of the invention.

FIG. 9 shows an optical detector in a plan view and a signal processing circuit partially in a block diagram according to the first embodiment of the invention. As shown in FIG. 9, in a package 20 of the optical detector 9, a light reception area 210 is disposed having four divisional light reception planes represented by symbols a, b, c and d and formed in a 田-character shape. Adjacent to the light reception area 210, a light reception area 211 having four divisional light reception planes represented by symbols e, f, g and h and a light reception area 212 having four divisional light reception planes represented by symbols i, j, k and l are disposed. The light reception areas 211 and 212 have the structure similar to the light reception area 210. Also to be disposed in the package 20 are a light reception area 410 having four divisional light reception planes represented by symbols m, n, o and p, a light reception area 411 having two divisional light reception planes represented by symbols q and r, and a light reception area 412 having two divisional light reception planes represented by symbols s and t. A light beam of the light spot 100 on a disc is converged at the light reception area 210 to form a detection light spot 110. Similarly, a light beam of the light spot 101 on the disc is converged at the light reception area 211 to form a detection light spot 111, and a light beam of the light spot 102 on the disc is converged at the light reception area 212 to form a detection light spot 112.

A light beam of the light spot 300 on a disc is converged at the light reception area 410 to form a detection light spot 310. Similarly, a light beam of the light spot 101 on the disc is converged at the light reception area 411 to form a detection light spot 311, and a light beam of the light spot 102 on the disc is converged at the light reception area 412 to form a detection light spots 311 and 312.

In the first embodiment of the invention, the optical system includes two laser sources having different wavelengths disposed in the same package (two-wavelength multi laser) and spaced by a small distance d, one diffraction grating and one optical detector. The column of the light reception areas 200, 201 and 202 and the column of the light reception areas 410, 411 and 412 are therefore disposed at different positions corresponding to the optical converging systems of the optical system. In addition, for the ±first-order diffracted light beams, the space between the light reception areas 411 and 412 corresponding to the laser source having a longer wavelength is set larger than that between the light reception areas 201 and 202, in proportion to the diffraction angle of the light beam by the diffraction grating 3.

A detection current photoelectrically converted by each of the light reception planes a, b, c and d is converted into a voltage by a corresponding one of current-voltage conversion amplifiers 40, 41, 42 and 43 and supplied to corresponding output terminals of the optical detector 9. Similarly, output lines from the light reception planes e, f, g, h, i, j, k, l, m, n, o, p, q, r, s and t are connected to corresponding current-voltage conversion amplifiers 44, 45, 46, 47, 48, 49, 50, 51, 80, 81, 82, 83, 84, 85, 86 and 87 (for simplification purposes of description, these voltage-converted detection signals are represented hereinafter by identical symbols to those of corresponding light reception plates from which detection signals are obtained). The detection signals a, b, c, d, e, f, g, h, i, j, k, l, m, n, o, p, q, r, s and t are output from the twenty output terminals of the optical detector 9.

Next, the calculation circuit will be described. Of the twenty detection signals output from the output terminals of the optical detector 9, the signals a, b, c and d are supplied to adders 52 and 53 and a subtractor 54 to output a signal (a+c)−(b+d), and to adders 55 and 56 and a subtractor 57 to output a signal (a+d)−(b+c). The signal (a+c)−(b+c) corresponds to a focus error signal of the light spot 100 on the disc detected by a so-called astigmatism method. The signals (a+b) and (b+c) correspond to the detection light amount of each of two planes of the detection light spot 110 divided in the disc tracking direction (radial direction). The difference signal (a+d)−(b+c) of these two signals corresponds to a tracking error signal of the light spot 100 on the disc detected by a so-called push-pull method.

The output signals a, b, c and d are also supplied to a differential phase detection circuit 77 which also detects a tracking error signal of the light spot 100 on the disc by a so-called differential phase detection method. The differential phase detection method is the already known technique so that the detailed description thereof is omitted.

A sum signal DVD-RF of the output signals a, b, c and d is calculated by an adder 76 so that a data signal recorded in the optical disc can be reproduced by a predetermined signal reproducing circuit. Although not shown in this embodiment, the adder 76 may be provided in the package 20 of the optical detector 9 and an output terminal for the sum signal (a+b+c+d) is added to the optical detector 9.

The output signals e, f, g and h are supplied to adders 58 and 59 and a subtractor 60 to generate a signal (e+g)−(f+h), and to adders 61 and 62 and a subtractor 63 to generate a signal (e+h)−(f+g). Similarly, the output signals i, j, k and l are supplied to adders 64 and 65 and a subtractor 66 to generate a signal (i+k)−(j+l), and to adders 67 and 68 and a subtractor 69 to generate a signal (i+l)−(j+k).

The signals (e+g)−(f+h) and (i+k)−(j+l) are supplied to an adder 70 to output a signal (e+g+i+k)−(f+h+j+l) which is amplified by an amplifier 71 at a predetermined amplification factor K1. This amplification factor K1 of the amplifier 71 is determined so that the amplitude of the signal (e+g+i+k)−(f+h+j+l) becomes approximately equal to that of the signal (a+c)−(b+d). This signal (e+g+i+k)−(f+h+j+l) corresponds to a sum signal of the focus error signals of the light spots 101 and 102 on the disc detected by the so-called astigmatism method.

The signals (e+h)−(f+g) and (i+l)−(j+k) are supplied to an adder 73 to output a signal (e+h+i+l)−(f+g+j+k) which is amplified by an amplifier 74 at a predetermined amplification factor K2. This amplification factor K2 of the amplifier 74 is determined so that the amplitude of the signal (e+h+i+l)−(f+g+j+k) becomes approximately equal to that of the signal (a+d)−(b+c). This signal (e+h+i+l)−(f+g+j+k) corresponds to a difference between total detection light amounts in two planes of the detection light spots 111 and 112 divided along the disc tracking direction (radial direction), and corresponds to a sum signal of the tracking error signals of the light spots 101 and 102 on the disc detected by the so-called push-pull method. A subtractor 75 outputs a signal {(a+d)−(b+c)}−K2·{(e+h+i+l)−(f+g+j+k)}. This signal corresponds to a signal obtained by subtracting the tracking error signals of the spots 101 and 102 on the disc obtained from the light reception areas 201 and 202 from the tracking error signal of the spot 100 on the disc obtained from the light reception area 200.

Switches 78 and 79 are provided at the focus error signal output terminal and the tracking error signal output terminal of the signal processing circuit. These switches are used to switch between the focus error signal and tracking error signal which are used for controlling the actuator 7 in accordance with the type of an optical disc. For example, when an optical disc such as a DVD-RAM disc having a continuous guide groove formed on the record surface of the disc is used, the switch 78 is first operated as shown in FIG. 9 to output a focus error signal {(a+c)−(b+d)}+K1·{(e+i+g+k)−(h+l+f+j)} obtained through addition by an adder 72 of the signal (a+c)−(b+d) output from the subtractor 54 and the signal K1·{(e+i+g+k)−(h+l+f+j) output from the amplifier 71. This focus error signal corresponds to a signal obtained through addition of the focus error signal of the light spot 100 on the optical disc obtained by the astigmatism method and the sum signal of the focus error signals of the light spots 101 and 102. Therefore, this signal is a good focus error signal whose feedthrough disturbance to be caused by diffraction at the guide groove is considerably reduced.

Next, the switch 79 is operated to output a tracking error signal {(a+d)−(b+c)}−K2·{(e+h +i+l)−(f+g+j+k)}. As described earlier, this signal corresponds to a signal obtained through subtraction of the sum signal of the tracking error signals of the spots 101 and 102 on the disc obtained from the light reception areas 211 and 212 from the tracking error signal of the spot 100 obtained from the light reception area 210. This method is called a differential push-pull method. Irrespective of detection by the push-pull method, this signal is a good tracking error signal whose off-set to be caused by the displacement of the objective lens is considerably reduced.

The output signals m, n, o and p are supplied to adders 88 and 89 and a subtractor 90 to output a signal (m+o)−(n+p), and to adders 91 and 92 and a subtractor 93 to output a signal (m+p)−(n+o). The signal (m+o)−(n+p) corresponds to a focus error signal of the light spot 300 on the disc detected by the so-called astigmatism method. The signals (m+p) and (n+o) correspond to the detection light amount of each of two planes of the detection light spot 310 divided in the disc tracking direction (radial direction). The difference signal (m+p)−(n+o) of these two signals corresponds a tracking error signal of the light spot 300 on the disc detected by the so-called push-pull method.

A sum signal CD-RF of the output signals m, n, o and p is calculated by an adder 99 so that a data signal recorded in the optical disc can be reproduced by the predetermined signal reproducing circuit. Although not shown in this embodiment, the adder 99 may be provided in the package 20 of the optical detector 9 and an output terminal for the sum signal (m+n+o+p) is added to the optical detector 9.

From the output signals q, r, s and t, a subtractor 94 outputs a tracking error signal (q−r) detected by the push-pull method and a subtractor 95 outputs a tracking error signal (s−t) detected by the push-pull method. An adder 96 outputs a signal (q+s)−(r+t) which is amplified by an amplifier 97 at a predetermined amplification factor K3. The amplification factor K3 of the amplifier 97 is determined so that the amplitude of the signal (q+s)−(r+t) becomes approximately equal to that of the signal (m+p)−(n+o). The signal (q+s)−(r+t) corresponds to a difference between total detection light amounts in two planes of the detection light spots 311 and 312 divided along the disc tracking direction (radial direction), and corresponds to a sum signal of the tracking error signals of the light spots 301 and 302 on the disc detected by the so-called push-pull method. A subtractor 98 outputs a signal {(m+p)−(n+o)}−K3·{(q+s)−(r+t)}. This signal corresponds to a signal obtained by subtracting the tracking error signals of the spots 101 and 102 on the disc obtained from the light reception areas 411 and 412 from the tracking error signal of the spot 100 on the disc obtained from the light reception area 410. This method is called the differential push-pull method. Therefore, irrespective of detection by the push-pull method, this signal is a good tracking error signal whose off-set to be caused by the displacement of the objective lens is considerably reduced.

When a reproduction-only disc such as a DVD-ROM disc having phase pits corresponding to record signals, disturbance dose not influence a focus error signal even if it is detected by the normal astigmatism method. Further, the tracking error signal detected by the differential phase detection method and output from the differential phase detection circuit 77 can be used. Therefore, by operating the switches 78 and 79 to obtain outputs of the signal of (a+c)−(b+d) as a focus error signal and the tracking error signal output from the differential phase detection circuit 77 as a tracking error signal, an error signal suitable for reproduction-only discs can be obtained. A signal can be reproduced reliably from a CD-ROM disc by using the astigmatism method and differential push-pull method.

Figure 10:
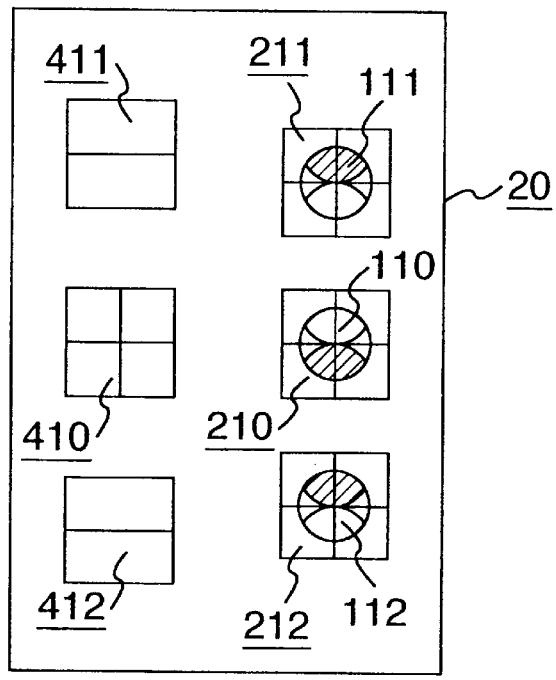
FIG. 10 is a diagram showing the illumination state of light spots detected from DVD.
Figure 11:
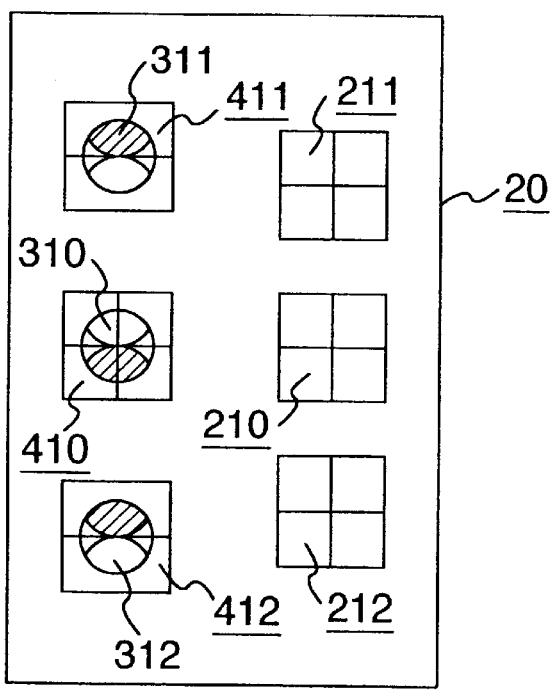
FIG. 11 is a diagram showing the illumination state of light spots detected from CD.
Figure 12:
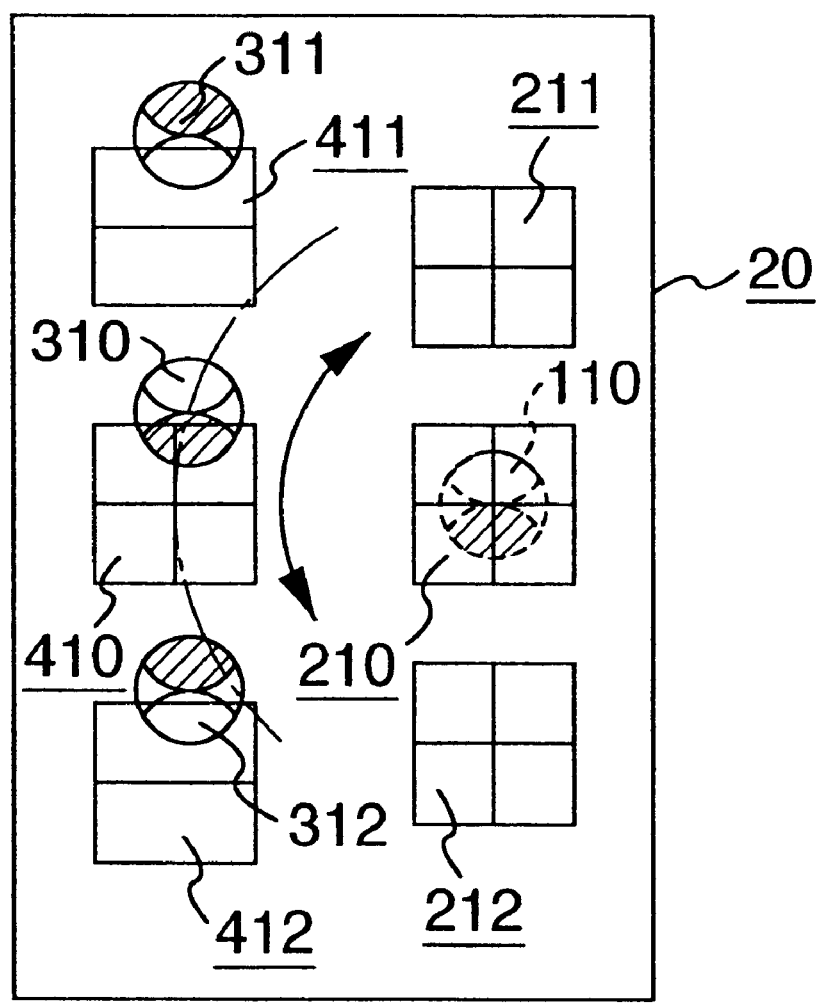
FIG. 12 is a diagram showing the illumination state of light spots detected from CD under the condition that only a DVD optical axis is adjusted.

Next, the position adjustment of a detection light spot on the light detection plane will be described. FIG. 10 shows light spots on the optical detector when a DVD disc is used, and FIG. 11 shows light spots on the optical detector when a CD is used. In FIG. 10, DVD detection light spots 110, 111 and 112 are applied to the light reception areas 210, 211 and 212 at predetermined positions, and in FIG. 11, CD detection light spots 310, 311 and 312 are applied to the light reception areas 410, 411 and 412 at predetermined positions. In the first embodiment of the invention, the optical axis of the converging optical system is set and adjusted based on the optical axis of DVD. Therefore, the detection light spots of CD are disposed at positions approximately proportional to the space between laser relative to the center of the optical axis of DVD. FIG. 12 shows detection light spots of CD after the optical axis of DVD is adjusted. The 0-order detection light spot 310 of CD is disposed on the circumference having as its center the position where the 0-order detection light of DVD is applied. The ± first-order detection light spots 311 and 312 of CD are disposed at diffracted positions about the 0-order detection light spot. As the semiconductor laser 2 is rotated around its optical axis, the 0-order detection light spot 310 of CD rotates along an arrow direction shown in FIG. 12. In this manner, the detection light spot positions of CD can be adjusted.

Figure 13:
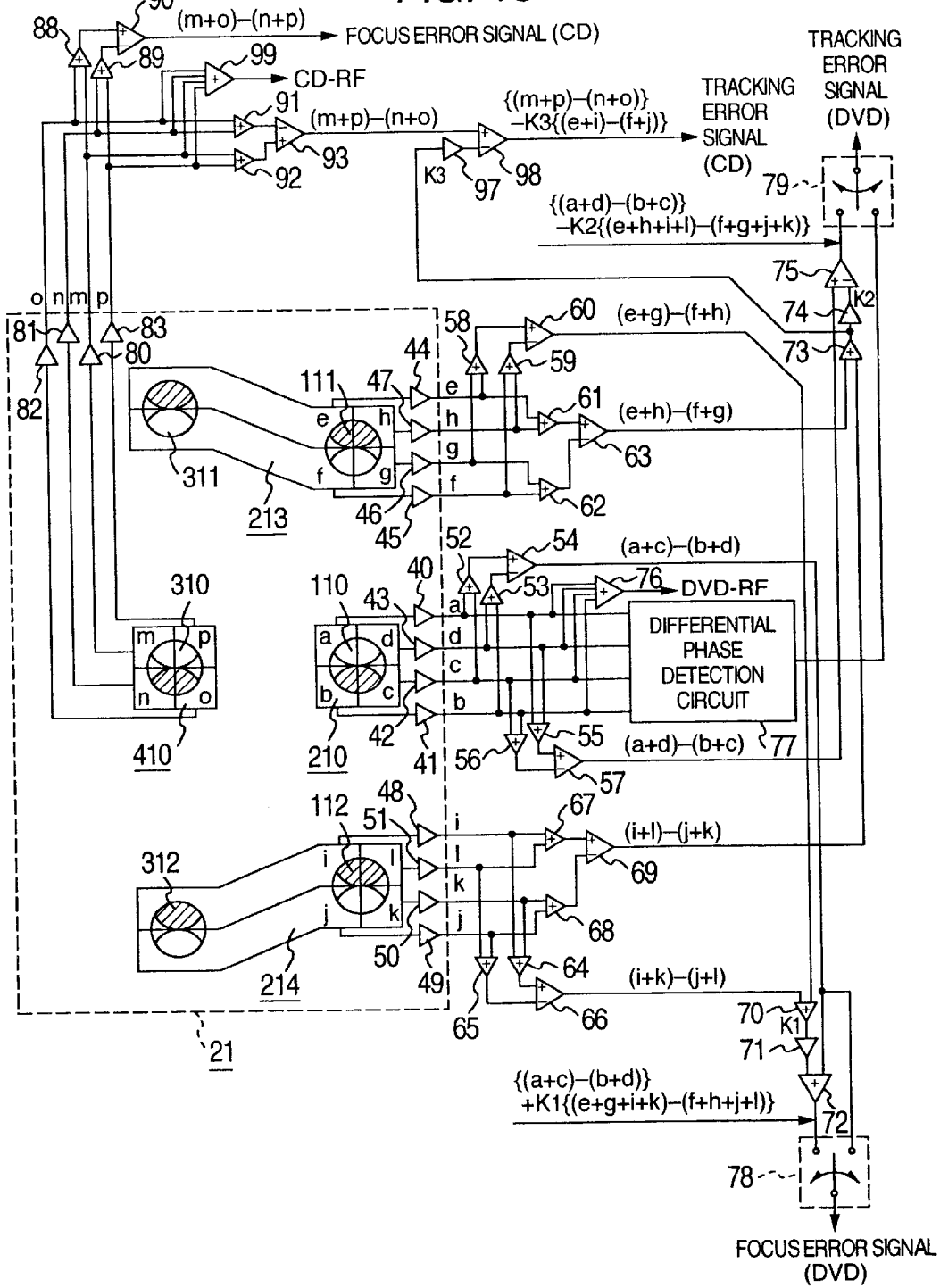
FIG. 13 shows an optical detector in a plan view and a signal processing circuit partially in a block diagram according to a second embodiment of the invention.

Next, the second embodiment of the invention will be described with reference to FIG. 13. Identical symbols and reference numerals in FIG. 13 to those in the foregoing description indicate to corresponding ones described above. The different point of the structure from that shown in FIG. 9 is the structure of the light reception areas in a package 21. In FIG. 13, the light reception areas for the ± first-order diffracted light spots are used both when a DVD-RAM disc is reproduced and when a CD-R disc is reproduced. Specifically, when a CD-R disc is reproduced or recorded, the light reception planes e, f, i and j of the light reception areas 213 and 214 are used to detect the focus error signal and tracking error signal in a manner similar to the first embodiment. With this structure, the number of output signal lines from the light reception planes can be reduced by four. The optical detector can therefore by manufactured easily and inexpensively. Also when a DVD-RAM disc is reproduced, light reflected from the optical disc will not return to the expanded area of the light reception planes. It is therefore obvious that the effects similar to those of the first embodiment can be obtained.

Figure 14:
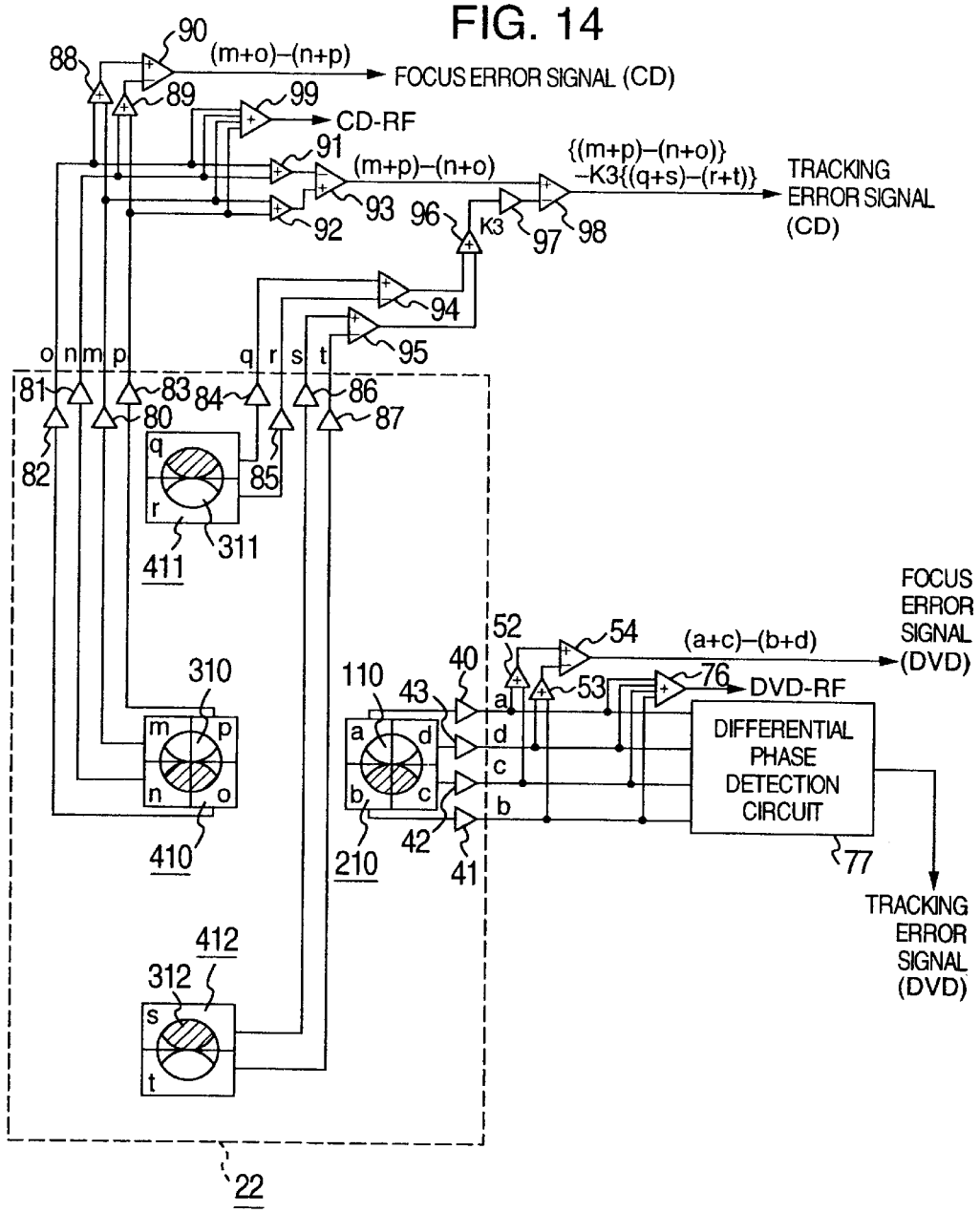
FIG. 14 shows an optical detector in a plan view and a signal processing circuit partially in a block diagram according to a third embodiment of the invention.

Next, the third embodiment of an optical detector and a signal processing circuit will be described with reference to FIG. 14. Identical symbols and reference numerals in FIG. 14 to those in the foregoing description indicate to corresponding ones described above. The different point of the structure from that shown in FIG. 9 is the structure of the light reception areas in a package 22. In FIG. 14, the light reception areas for the ± first-order diffracted light spots to be used when a DVD-RAM disc is reproduced are omitted. Therefore, since the focus error signal detected by the astigmatism method is influenced by feedthrough disturbance, reproduction of a DVD-RAM disc is difficult. When a CD-R disc is reproduced, the tracking error signal can be detected by the differential push-pull method, and a diffraction grating dedicated only to CD-R can be used. Therefore, the positions of the ± first-order diffracted light spots on the CD disc 2 can be adjusted easily by rotating the diffraction grating.

Figure 15:
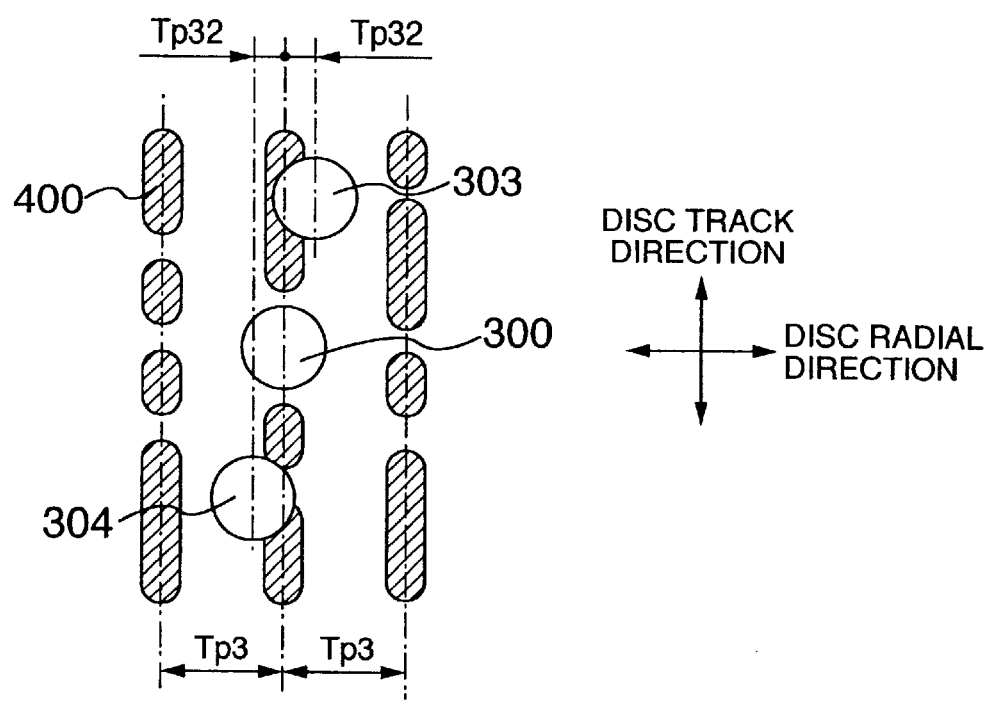
FIG. 15 is a diagram showing the position of spots on a CD-ROM disc according to a fourth embodiment of the invention.
Figure 16:
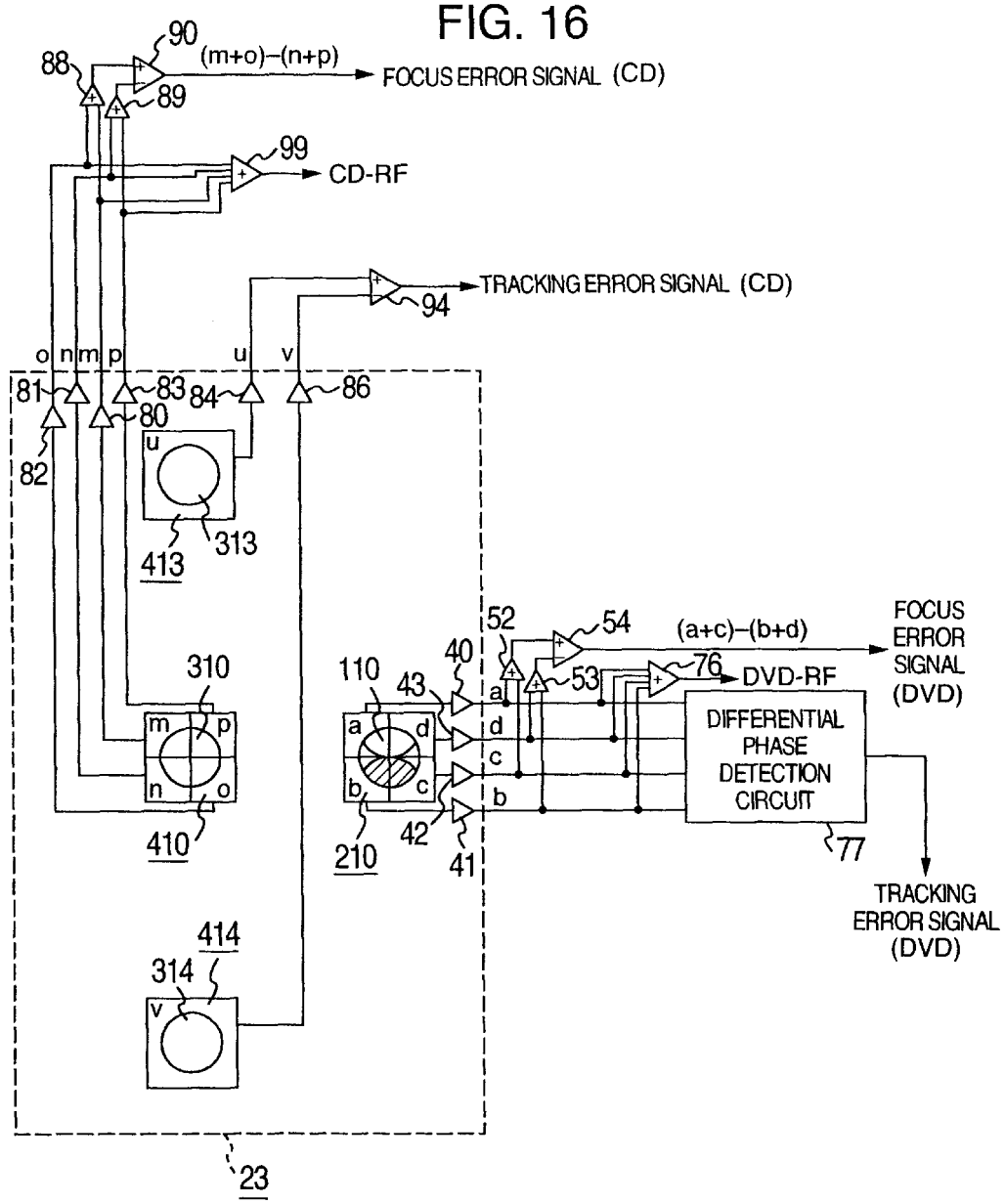
FIG. 16 shows an optical detector in a plan view and a signal processing circuit partially in a block diagram according to the fourth embodiment of the invention.

Next, the fourth embodiment of an optical detector and a signal processing circuit will be described with reference to FIGS. 15 and 16. Identical symbols and reference numerals in FIGS. 15 and 16 to those in the foregoing description indicate corresponding ones described above. FIG. 15 shows light spots on a CD-ROM disc. Record pits 400 are disposed at an interval Tp3 (1.6 $\mu$m) in the track direction. Light spots on the optical disc 10 include a 0-order light spot and ± first-order diffracted light spots. The ± first-order diffracted light spots 301 and 302 are disposed at a space Tp32 (0.4 $\mu$m) corresponding to one fourth Tp3 from the 0-order spot 300. FIG. 16 shows the optical detector in plan and the signal processing circuit partially in block. The different point from the structure shown in FIG. 14 resides in the structure of the light reception areas in package 23. In FIG. 16, the light reception areas for receiving the ± first-order diffracted light spots on CD are each constituted of a single plane of light reception planes 413 and 414. Outputs from the light reception planes 413 and 414 are supplied to current-voltage conversion amplifiers 84 and 86 and to a subtractor 94 which outputs a difference signal between the ± first-order diffracted light spots. By combining the spot positions on the optical disc 10 shown in FIG. 15, it is possible to detect the tracking error signal through the three-beam method.

Figure 17A:
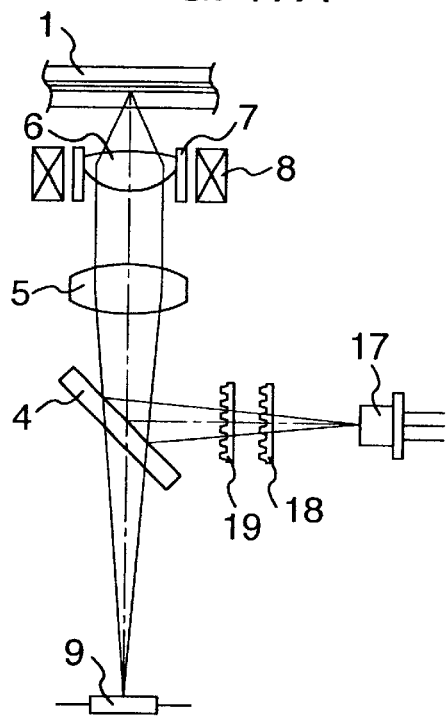
FIGS. 17A and 17B are diagrams showing the structure of an optical pickup according to a fifth embodiment of the invention.
Figure 17B:
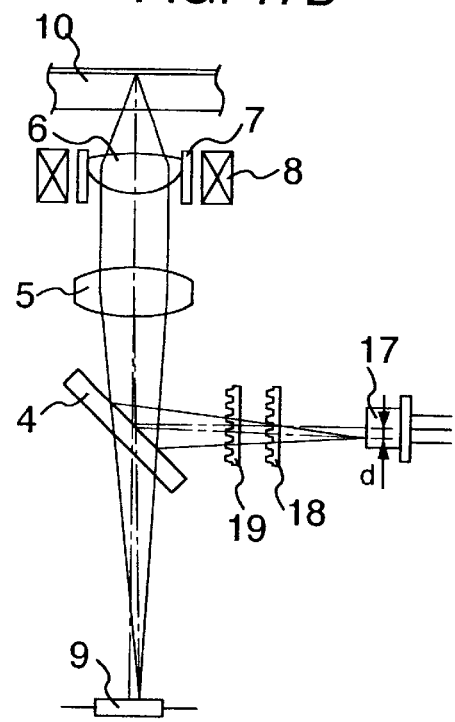
Figure 18:
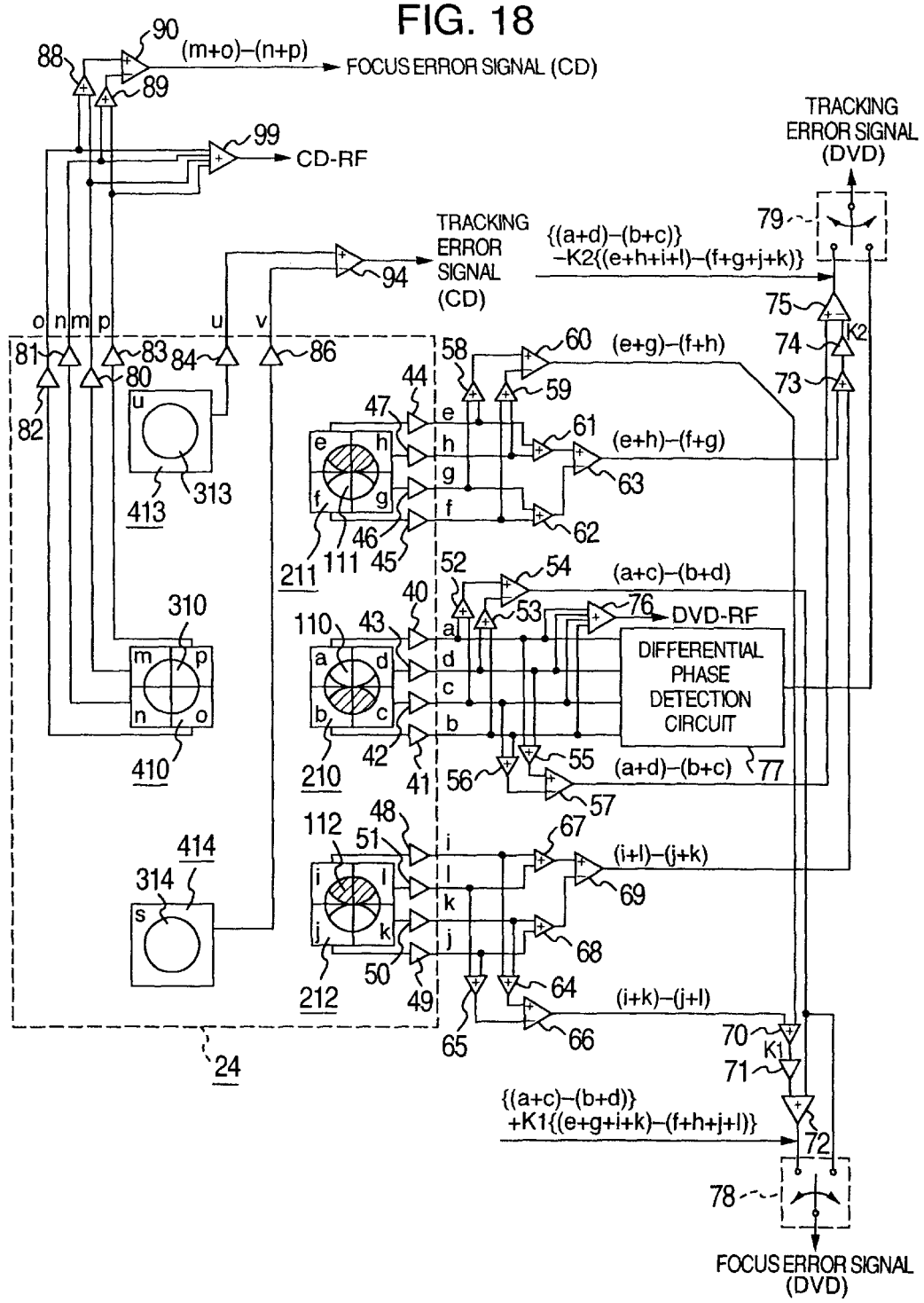
FIG. 18 shows an optical detector in a plan view and a signal processing circuit partially in a block diagram according to a fifth embodiment of the invention.

Next, the fifth embodiment of an optical detector and a signal processing circuit will be described with reference to FIGS. 17A and 17B and FIG. 18. Identical symbols and reference numerals in FIGS. 17A and 17B and FIG. 18 to those used in the foregoing description indicate corresponding ones described above. FIGS. 17A and 17B show the structure of the optical system according to the fifth embodiment. The different point from the first embodiment shown in FIGS. 2A and 2B is that two laser sources having different wavelength disposed in the same package to constitute the semiconductor laser 17 (two-wavelength multi laser) are disposed so that the polarization directions of the laser beams emitted from the two laser sources cross near at a right angle, and that two polarization diffraction gratings 18 and 19 are disposed along the optical path. The diffraction directions by the polarization of the polarization diffraction gratings 18 and 19 are orthogonal, and the diffraction directions by the polarization are made coincident with the polarization direction of the laser source. It is therefore possible to freely set the grating grooves and angles of each polarization diffraction grating. FIG. 18 shows the optical detector in plan and the signal processing circuit partially in block. The different point from the structure shown in FIG. 14 is the structure of the light reception areas in a package 24. In FIG. 18, similar to that shown in FIG. 16, the light reception areas for receiving the ± first-order diffracted light spots on CD are each constituted of a single plane of the light reception planes 413 and 414. Outputs from the light reception planes 413 and 414 are supplied to the current-voltage conversion amplifiers 84 and 86 and to the subtractor 94 which outputs a difference signal between the ± first-order diffracted light spots. As described earlier, the polarization diffraction gratings 18 and 19 can be designed independently. Therefore, for example, the positions of light spots can be determined independently for the optical disc 1 such as DVD-RAM and for the optical disc 10 such as CD-ROM. The positions of spots on DVD can therefore be set as shown in FIG. 4. Accordingly, the focus error signal and tracking error signal necessary for reproducing DVD-ROM and DVD-RAM discs can be detected and at the same time the position of spots on CD can be set as shown in FIG. 15. It is possible to detect the tracking error signal through the three-beam method.

Figure 19A:
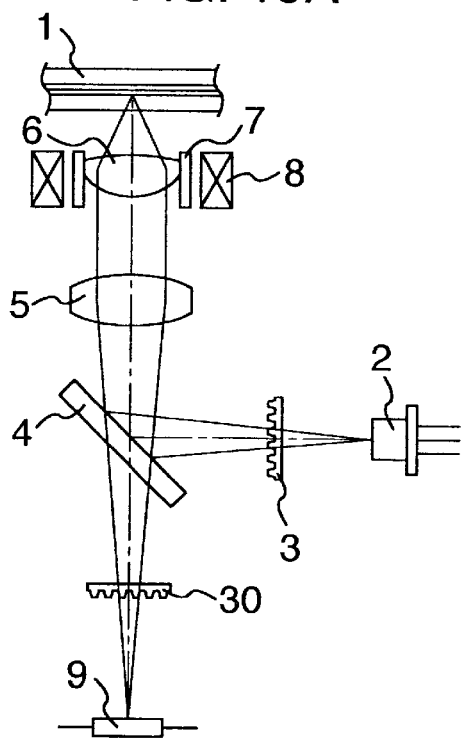
FIGS. 19A and 19B show an optical detector in a plan view and a signal processing circuit partially in a block diagram according to a sixth embodiment of the invention.
Figure 19B:
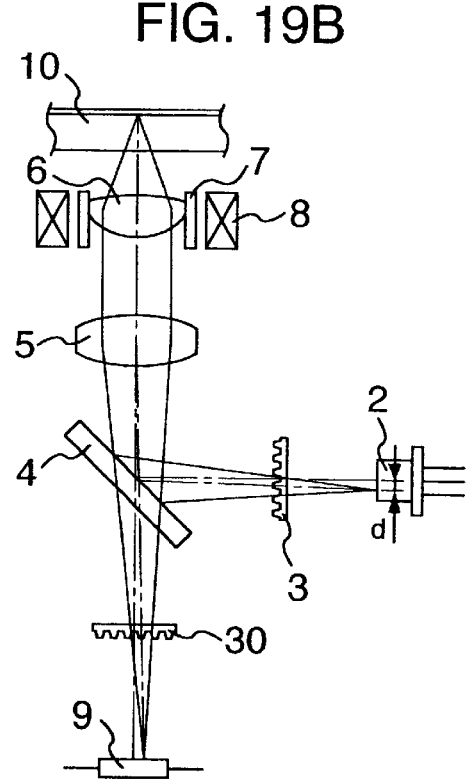
Figure 20:
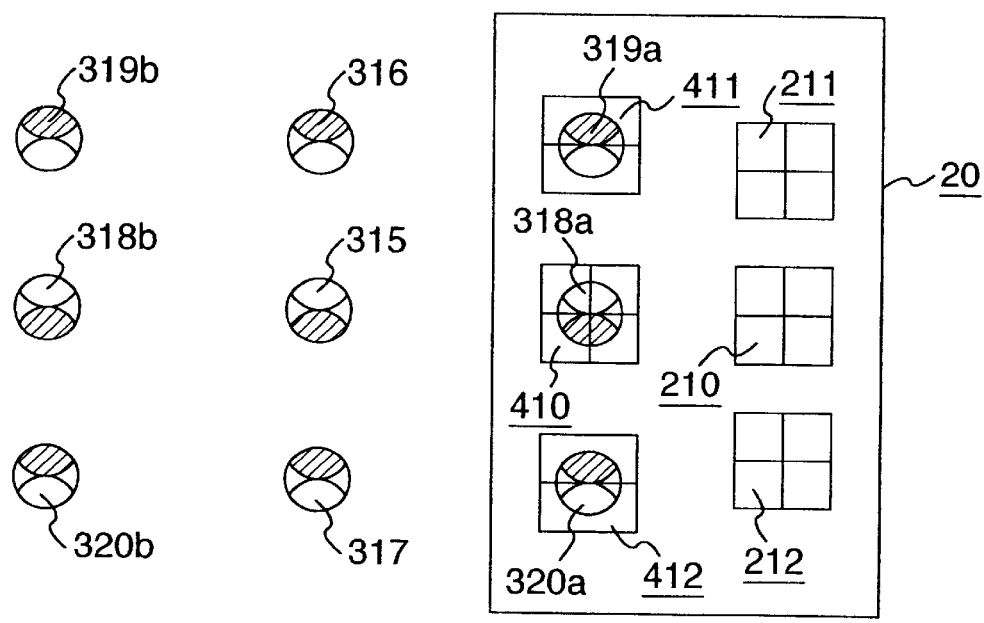
FIG. 20 is a diagram showing the illumination state of light spots detected from CD according to the sixth embodiment of the invention.
Figure 21:
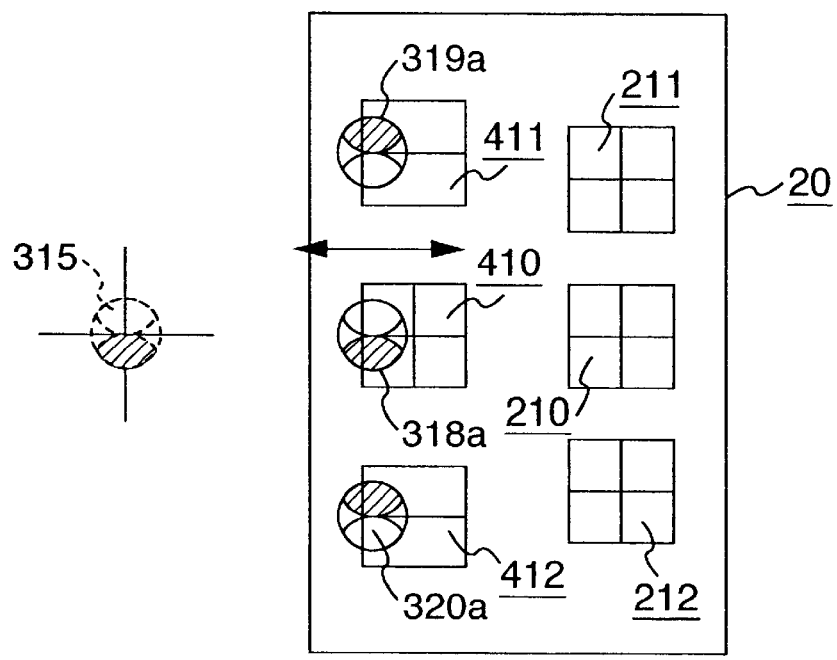
FIG. 21 is a diagram showing the parallel displacement of light spots detected from CD according to the sixth embodiment of the invention.
Figure 22:
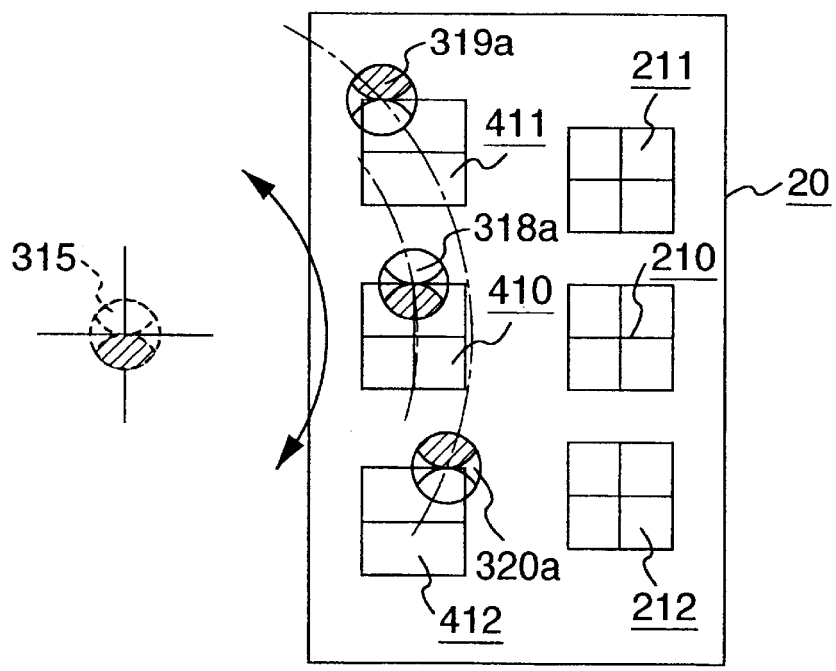
FIG. 22 is a diagram showing the rotary displacement of light spots detected from CD according to the sixth embodiment of the invention.

Next, a method of adjusting a detection light spot according to the sixth embodiment of the invention will be described with reference to FIGS. 19A and 19B to FIG. 22. Identical symbols and reference numerals in FIGS. 19A and 19B to FIG. 22 to those used in the foregoing description indicate corresponding ones described above. FIGS. 19A and 19B show the structure of the optical pickup according to the sixth embodiment. The different point from the first embodiment shown in FIGS. 2A and 2B is that a dichromatic diffraction grating 30 is disposed on an optical path between the half mirror in the converging optical system and the optical detector 9. This dichromatic diffraction grating 30 has the characteristics of diffracting only the light beam reflected from the optical disc 10 such as CD. Therefore, the positions of detection light spots of DVD on the optical detector 9 become as shown in FIG. 10, whereas the positions of detection light spots of CD on the optical detector 9 become as shown in FIG. 20 because of diffraction of light beams by the dichromatic diffraction grating 30. In FIG. 20, detection light spots 315, 316 and 317 are 0-order light spots passed through the dichromatic diffraction grating 30, detection light spots 318*a,* 319*a* and 320*a* are + first-order light spots diffracted by the dichromatic diffraction grating 30, and detection light spots 318*b,* 319*b* and 320*b* are – first-order light spots diffracted by the dichromatic diffraction grating 30. In the sixth embodiment, the + first order light spots 318*a,* 319*a* and 320*a* diffracted by the dichromatic diffraction grating 30 are applied to the light reception areas 410, 411 and 412. Therefore, as shown in FIG. 21, the detection light spots 318*a,* 319*a* and 320*a* can be set near to or remote from the 0-order detection light spots by moving forward or backward the dichromatic diffraction grating 30. As shown in FIG. 22, by rotating the dichromatic diffraction grating 30, the detection light spots 318*a,* 319*a* and 320*a* can be rotated around the 0-order detection light spot 315. The positions of detection light spots can be adjusted by the position and rotation of the dichromatic diffraction grating 30. Accordingly, the illumination positions of detection light spots for CD can be set in the light reception range of the light reception area.

As shown in FIG. 21, by moving the dichromatic diffraction grating 30 back and forth along the optical axis, the light detection spots 318*a,* 319*a* and 320*a* can be moved near to or away from the 0-order detection light spot. It is therefore possible to set the light reception area of the optical detector 9 at a desired position. Namely, by adjusting the position of the dichromatic diffraction grating 30, it is possible to expand the degree of freedom of designing the position of the light reception area of the optical detector. Such examples are shown in FIGS. 10, 20 and 21. In FIG. 20, detection light spots for DVD are applied to the light reception areas 210, 211 and 212 (refer to FIG. 10), and detection light spots for CD are applied to the light reception areas 410, 411 and 412. By adjusting the position of the dichromatic diffraction grating 30, the detection light spots 318*a,* 319*a* and 320*a* for CD can be applied to the light reception areas 410, 411 and 412, as shown in FIG. 21. Also in FIG. 21, by adjusting the position of the dichromatic diffraction grating 30, the detection light spots 318*a,* 319*a* and 320*a* for CD can be applied to the light reception areas 210, 211 and 212.

For example, a reflection light beam (0-order light beam from the dichromatic diffraction grating 30) for detecting DVD is set so that the detection light spot on the optical detector 9 is illuminated at a predetermined position of the light reception area in a receivable light reception range as shown in FIG. 10.

The predetermined position is such a position in the light reception area that when a detection light spot is applied to this position, an output signal derived from this detected light spot can be used at the later signal processing and the like.

Specifically, in the illumination state of the detection light spot on the optical detector 9 shown in FIG. 10, the positions of the optical detector 9 and the like are determined so that an output signal derived from the detected light spot and applied at the position in the light reception area can be used at the later signal processing and the like. The reflection light beam (+ or – first-order light beam from the dichromatic diffraction grating 30) for detecting CD is not necessarily set so that the detection light spot is applied to the predetermined position in the light reception area in the receivable light reception range as described above with DVD, because of manufacture variations or the like. Therefore, if the position of the optical detector 9 is determined by using as a reference the reflection light beam for detecting DVD, the reflection light beam for detecting CD is not necessarily set so that the detection light spot is applied to the predetermined position in the light reception area in the receivable light reception range.

The reflection light beam for detecting CD is the light beam diffracted by the dichromatic diffraction grating 30. Therefore, by moving the dichromatic diffraction grating 30 back and forth along the optical axis or rotating it around the optical axis, it is possible to make the illumination position of the reflection light beam for detecting CD be near to or away from the light reception area of DVD. By moving the dichromatic diffraction grating 30 back and forth along the optical axis or rotating it around the optical axis, adjustment is therefore possible so that the illumination position of the reflection light beam for detecting CD is set to the predetermined position in the light reception area in the receivable light reception range. In this adjustment, since the reflection light beam for detecting DVD is the 0-order light beam from the dichromatic diffraction grating 30, the detection light spot can be applied to the predetermined position in the light reception area in the receivable light reception range.

In the above description, the dichromatic diffraction grating 30 does not diffract the light beam for DVD, and diffracts only the light beam for CD. The invention is not limited only thereto.

Namely, as in this embodiment, when the 0-order light beam from the dichromatic diffraction grating 30 is used as the reflection light beam for detecting DVD and the + or − first-order light beam from the dichromatic diffraction grating 30 is used as the reflection light beam for detecting CD, the dichromatic diffraction grating 30 may have a function of diffracting both the light beams for DVD and CD.

Next, embodiments will be described in which by moving the dichromatic diffraction grating 30 back and forth along the optical axis or rotating it around the optical axis, adjustment is made so that the illumination position of the reflection light beam for detecting CD or DVD is set to the predetermined position in the light reception area in the receivable light reception range.

In the seventh to ninth embodiments to be described hereinunder, the relation of the equation (1) is utilized to make one three-spot diffraction grating generate light beams capable of detecting DPP signals for both CD-series and DVD-series discs.

FIG. 23 is a schematic diagram showing the structure of an optical pickup according to the seventh embodiment of the invention. A laser beam source 7001 is a two-wavelength multi laser source having two semiconductor laser chips having different oscillation wavelengths (650 nm band and 780 nm band) housed in the same package.

In reproducing a high density optical disc such as DVD-ROM, the two-wavelength multi laser source 7001 radiates a light beam in the 650 nm wavelength band. This light beam passes through a three-spot diffraction grating 7009. The diffracted light beams are reflected by a half mirror 7003 disposed at an angle of 45° relative to the optical axis. The reflected light beams are further reflected by a rising mirror 7004 and changed to parallel light fluxes by a collimator lens 7005 which fluxes reach an objective lens 7006. This objective lens 7008 is supported by an actuator 7007, and converges light beams on an optical disc 7008 to form light spots. The light beams reflected from the optical disc propagate along a reversed optical path of the incoming optical path to become incident upon the half mirror 7003 via the objective lens 7006, collimator lens 7005 and rising mirror 7004. The light beams transmitted through the half mirror 7003 reach a hologram element 7010. As will be later described, the hologram element 7010 has a grating groove pattern which can separate a + first-order diffracted light beam or − first-order diffracted light beam from the optical beam in the 780 nm wavelength band and converge it on a predetermined light reception area of the optical detector 7002. In this case, a light beam in the 650 nm wavelength band also generates a 0-order light beam and ± diffracted light beams. However, in this embodiment, it is designed such that only the 0-order light beam transmitted straight through the hologram element 7010 passes through a detection lens 7011 and becomes incident upon a predetermined light reception area of the optical detector 7002. The detection lens 7011 is made of a combination of a cylindrical lens and a convex lens. The detection lens 7011 has a function of converging the 0-order light beam on a predetermined light reception area of the optical detector 7002 and a function of cancelling coma added to the 0-order light beam by the half mirror 7003 and astigmatism in the y- and x-directions in FIG. 23 and generating a predetermined amount of astigmatism in a direction slanted by 45° relative to the y-axis in the x-y plane.

In reproducing a conventional optical disc such as CD-ROM, the two-wavelength multi laser source 7001 radiates a light beam in the 780 nm wavelength band. Similar to the above case, this light beam passes through the three-spot diffraction grating 7009 to be diffracted and separated into a 0-order diffracted light beam and ± first-order light beams. In this case, the light beam is diffracted and separated so that the light beams form light spots on the optical disc 7008 each shifted by a quarter track pitch in the disc radial direction. The light beams passed through the diffraction grating 7009 are reflected by the half mirror 7003 disposed at an angle of 45° relative to the optical axis. The light beams are further reflected by the rising mirror 7004 and changed to parallel light fluxes by the collimator lens 7005 which fluxes reach the objective lens 7006. The objective lens 7006 is supported by the actuator 7007 and has a function of converging the light beams in the 650 nm wavelength band on a DVD disc as described earlier and converging the light beams in the 780 nm wavelength band on the optical disc 7008 such as a CD-ROM disc.

The light beams reflected from the optical disc 7008 propagate along a reversed optical path of the incoming optical path to become incident upon the half mirror 7003 via the objective lens 7006, collimator lens 7005 and rising mirror 7004. The light beams transmitted through the half mirror 7003 reach the hologram element 7010. The hologram element 7010 has a predetermined grating groove pattern. The light beam in the 780 nm wavelength band is diffracted and separated at a predetermined diffraction efficiency to generate ± first-order diffracted light beams. The hologram element 7010 cancels astigmatism and coma generated in the + first-order or − first-order diffracted light beam when the light beam passes through the half mirror 7003 and detection lens 7011. The detection lens 7011 converges without any aberration the diffracted light beam on a predetermined light reception area of the optical detector 7002 at a position different from the predetermined light reception area for the light beam of the 650 nm wavelength band.

In FIG. 21, by moving the dichromatic diffraction grating 30 back and forth along the optical axis, the light detection spots 318a, 319a and 320a can be set near to or away from the 0-order light detection spot, as described already.

Also in FIG. 23, by moving the hologram element 7010 back and forth along the optical axis, the position of the light beam in the 780 nm wavelength band in the optical detector 7002 can be changed. By utilizing this, the illumination position of the detection light spot of CD in the optical detector 7002 can be adjusted as shown in FIG. 23. By adjusting the position of the hologram element 7010, the degree of design freedom of laying out the light reception areas of the optical detector 7002 can be expanded. For example, the light reception areas of the light detector 7002 for the light beam in the 780 nm wavelength band reflected from an optical disc and the light reception areas of the light detector 7002 for the light beam in the 650 nm wavelength band reflected from an optical disc can be disposed linearly.

Alternatively, the light beams in both the 650 nm and 780 nm wavelength bands reflected from optical discs can be converged on the same light reception areas of the optical detector 7002. Namely the light reception areas can be used in common for the light beams in both the 650 nm and 780 nm wavelength bands.

In this embodiment, for example, as described earlier the three-spot diffraction grating 7009 has the grating groove pattern which can diffract and separate an incidence light beam in the 650 nm wavelength band to generate a 0-order light beam 7102a and ± first-order light beams 7102b and 7102c and form light spots on the optical disc 7008 such as DVD-ROM and DVD-R at a spot distance δ of about 0.67 μm as shown in FIGS. 24A and 24B, and which can diffract and separate an incidence light beam in the 780 nm wavelength band to generate a 0-order light beam 7103a and ± first-order light beams 7103b and 7103c and form light spots on the optical disc 7008 such as CD-ROM and CD-R at a spot distance δ' of about 0.8 μm as shown in FIG. 24C. The hologram pattern of the hologram element 7010 may be an equal distance and linear pattern if it provides a function of guiding the 0-order light beam in the 650 nm wavelength band diffracted and separated by the hologram element 7010 and the + or − first-order diffracted light beam in the 780 nm wavelength band diffracted and separated by the hologram element 7010, to predetermined areas of the optical detector 7002. It is obvious that the grating groove pattern of the hologram element 7010 may be a predetermined unequal distance and curved pattern. By using a grating having a proper unequal distance curved grating groove pattern, predetermined waved plane aberration can be added to the + or − first-order diffracted light beam guided to the optical detector 7002. It is therefore possible to correct unnecessary aberration components contained in the + or − first-order diffracted light beam and the focus position thereof. Good detection light spots can therefore be applied to the optical detector.

Figure 25A:
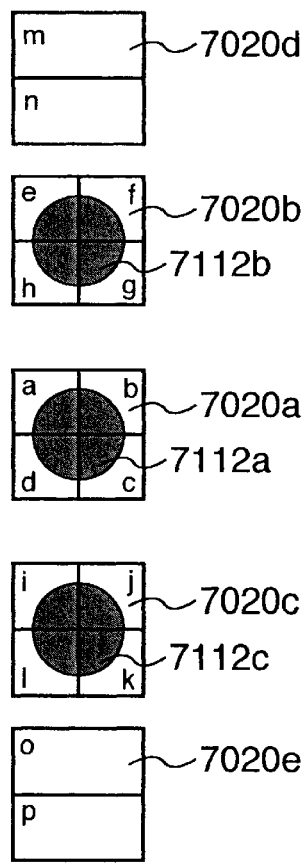
FIG. 25A shows a light reception plane pattern of light reception areas of the optical detector of the seventh embodiment (during DVD reproduction).
Figure 25B:
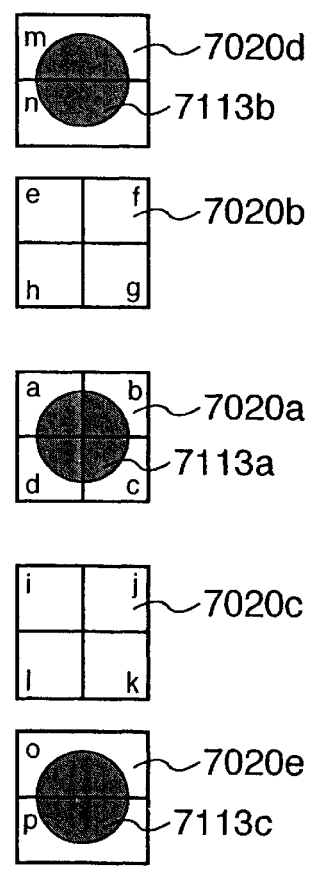
FIG. 25B shows a light reception plane pattern of light reception areas of the optical detector of the seventh embodiment (during CD reproduction).

The light reception plane pattern of light reception areas of the optical detector 7002 of this embodiment will be described with reference to FIGS. 25A and 25B. As shown in FIGS. 25A and 25B, the light reception plane pattern of light reception areas has sixteen independent light reception planes disposed linearly, including three light reception areas each divided into four light reception planes in a ⊞-character shape and two light reception areas each divided into two light reception planes. In reproducing a DVD-series disc, disc reflection beams of the spots 7102a, 7102b and 7102c on the optical disc shown in FIGS. 24A and 24B form light spots 7112a, 7112b and 7112c in the corresponding light reception areas as shown in FIG. 25A. In reproducing a CD-series disc, disc reflection beams of the spots 7103a, 7103b and 7103c on the optical disc shown in FIG. 24C form light spots 7113a, 7113b and 7113c in the corresponding light reception areas as shown in FIG. 25B. Of the light beams diffracted and separated by the three-spot diffraction grating 7009, the light reception area 7020a for detecting the 0-order light beam is used for reproducing both a DVD-series disc and a CD-series disc, as shown in FIGS. 25A and 25B. However, of the light beams diffracted and separated by the three-spot diffraction grating 7009, different light reception areas for detecting the + or − first-order light beam are used for reproducing a DVD-series disc and a CD-series disc. The reason for this is as follows. The diffraction angle of a light beam by a diffraction grating is generally proportional to the wavelength as described earlier. The spot distance of the 0-order and ± first-order light beams in the 780 nm wavelength band diffracted and separated by the three-spot diffraction grating 7009 is expanded by about 1.2 times (=780/650) relative to the spot distance of the light beams in the 650 nm wavelength band. Although the spot distance on the optical detector 7002 during reproducing a DVD-series disc is different from that during reproducing a CD-series disc, light beams are detected by using different light reception areas in order to adopt the differential push-pull method for both DVD and CD series.

Figure 26:
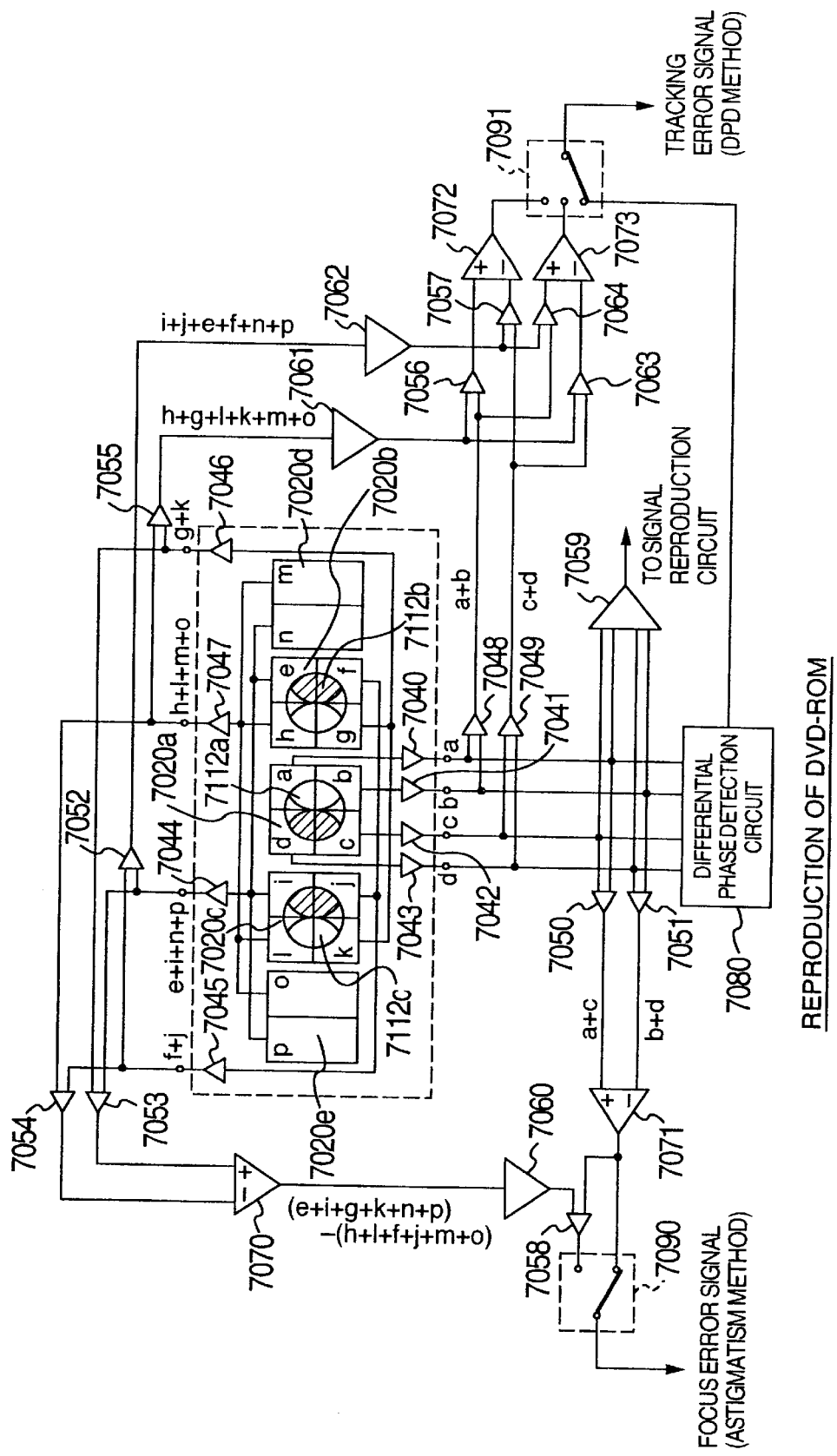
FIG. 26 is a schematic diagram of a signal processing circuit used for DVD-ROM reproduction according to the seventh embodiment.

A method of detecting a focus error signal and a tracking error signal by such an optical detector has been described already and so the detailed description is omitted. By using a calculation circuit such as shown in FIG. 26, a focus error signal is detected by an astigmatism method and a tracking error signal is detected by a differential phase detection method (DPD method). In FIG. 26, reference numerals 7040, 7041, 7042, 7043, 7044, 7045, 7046 and 7047 represent current-voltage conversion amplifiers, reference numerals 7048, 7049, 7050, 7051, 7052, 7053, 7054, 7055, 7056, 7057, 7058, 7059, 7063 and 7064 represent adders, reference numerals 7070, 7071, 7072 and 7073 represent subtractors, reference numerals 7090 and 7091 represent turnover switches, reference numeral 7080 represents a differential phase detection circuit, reference numeral 7060 represents a gain factor K3, and reference numeral 7061 and 7062 represent amplifiers having a gain factor K4. In the following drawings, identical reference numerals to those shown in FIG. 26 represent those elements described above.

Figure 27:
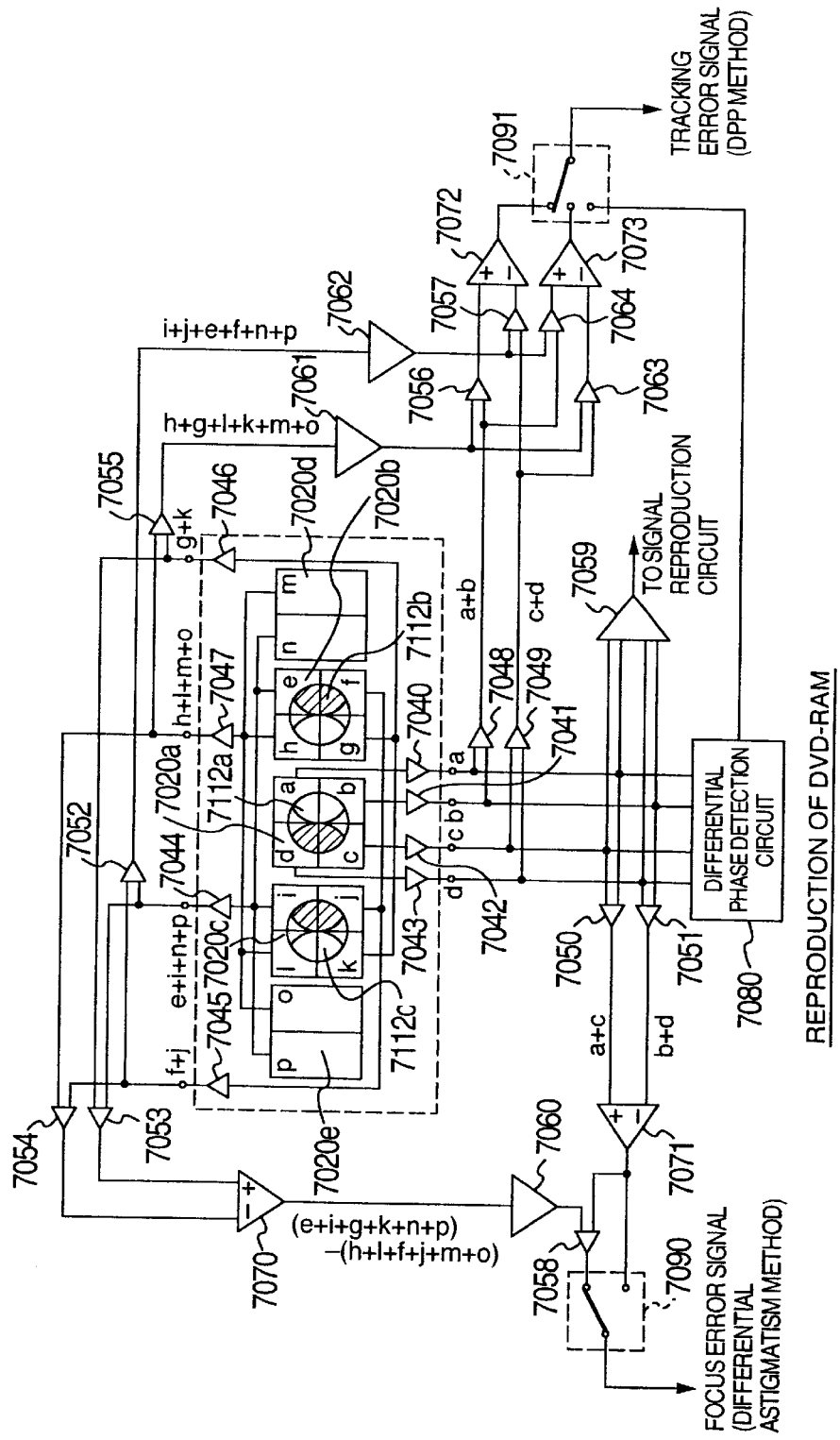
FIG. 27 is a schematic diagram of a signal processing circuit used for DVD-RAM reproduction according to the seventh embodiment.
Figure 28:
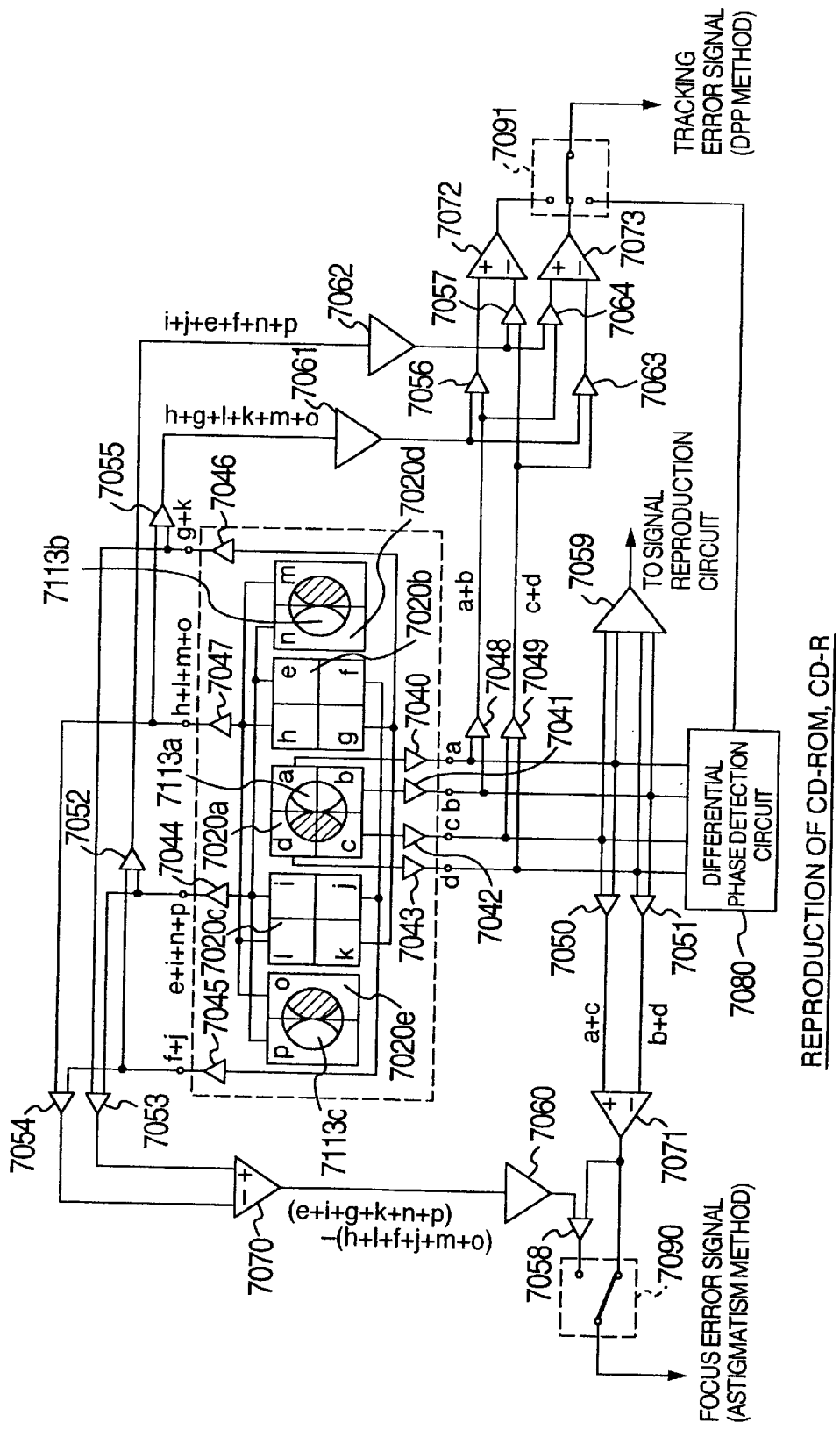
FIG. 28 is a schematic diagram of a signal processing circuit used for CD-ROM or CD-R reproduction according to the seventh embodiment.

In reproducing a DVD-RAM disc, a calculation circuit shown in FIG. 27 is used. A focus error signal is detected by a differential astigmatism method (the details are disclosed in Japanese Patent Application 11-171844, and so they are omitted), and a tracking error signal is detected by the differential push-pull method (DPP method).

In reproducing a CD-series disc such as CD-ROM and CD-R, a calculation circuit shown in FIG. 17 is used. A focus error signal is detected by the differential astigmatism method and a tracking error signal is detected by the differential push-pull method (DPP method).

In this embodiment, the light reception plane pattern of light reception areas of the optical detector 7002 having sixteen light reception planes shown in FIGS. 25A and 25B is used. The light reception plane patter of light reception areas of this invention is not intended to be limited only to such arrangement. The invention is applicable to any of other light reception plane patterns of light reception areas so long as they can detect various servo signals and information signals from the light beams applied to the same optical detector during reproducing at least a DVD-series disc and a CD-series disc. Embodiments of other light reception plane patterns of light reception areas of the optical detector 7002 will be described hereinunder.

The eighth embodiment of the invention has the same structure as that of the optical pickup of the seventh embodiments, excepting the light reception plane pattern of light reception areas. As shown in FIGS. 29A and 29B, the light reception plane pattern of light reception areas has fourteen independent light reception planes disposed linearly, including one light reception area divided into four light reception planes in a 田-character shape and two light reception areas each divided into five light reception planes. With this light reception plane pattern of light reception areas, of the light beams diffracted and separated by the three-spot diffraction grating 7009, the same light reception area for detecting the + or − first-order light beam is used for reproducing both a DVD-series disc and a CD-series disc. By this, the number of the reception planes can be reduced.

As a method of detecting a focus error signal and a tracking error signal by such an optical detector, the detection methods described with the seventh embodiment can be used and so the detailed description thereof is omitted. In reproducing a DVD-ROM disc, a calculation circuit shown in FIG. 30 is used. A focus error signal is detected by the astigmatism method and a tracking error signal is detected by the differential phase detection method (DPD method).

Figure 31:
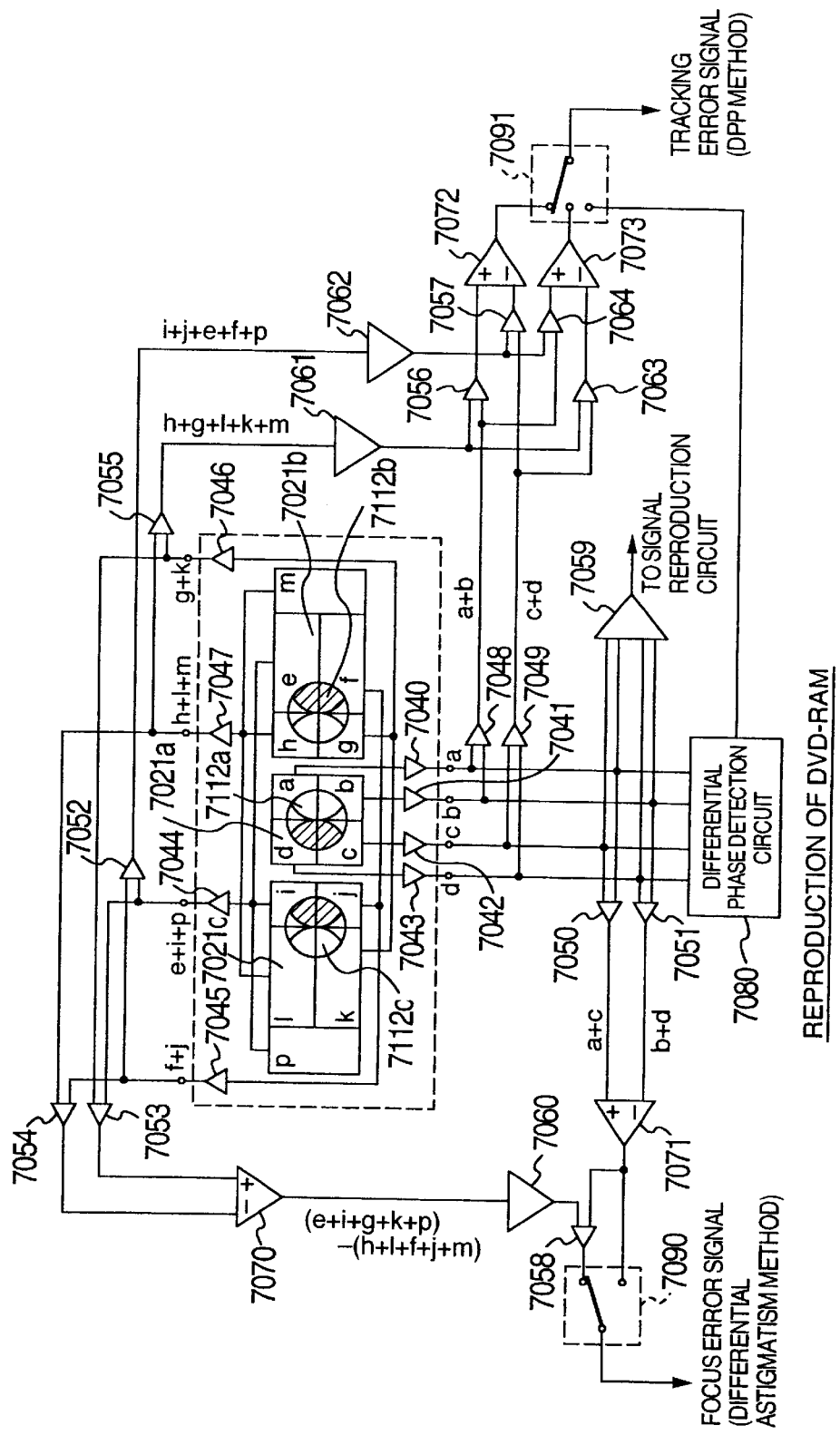
FIG. 31 is a schematic diagram of a signal processing circuit used for DVD-RAM reproduction according to the eighth embodiment.

In reproducing a DVD-RAM disc, a calculation circuit shown in FIG. 31 is used. A focus error signal is detected by the differential astigmatism method and a tracking error signal is detected by the differential push-pull method (DPP method).

In reproducing a CD-series disc such as CD-ROM and CD-R, a calculation circuit shown in FIG. 32 is used. A focus error signal is detected by the astigmatism method and a tracking error signal is detected by the differential push-pull method (DPP method).

Another embodiment will be described which uses a modified light reception plane pattern of light reception areas of the seventh embodiment.

Figure 34:
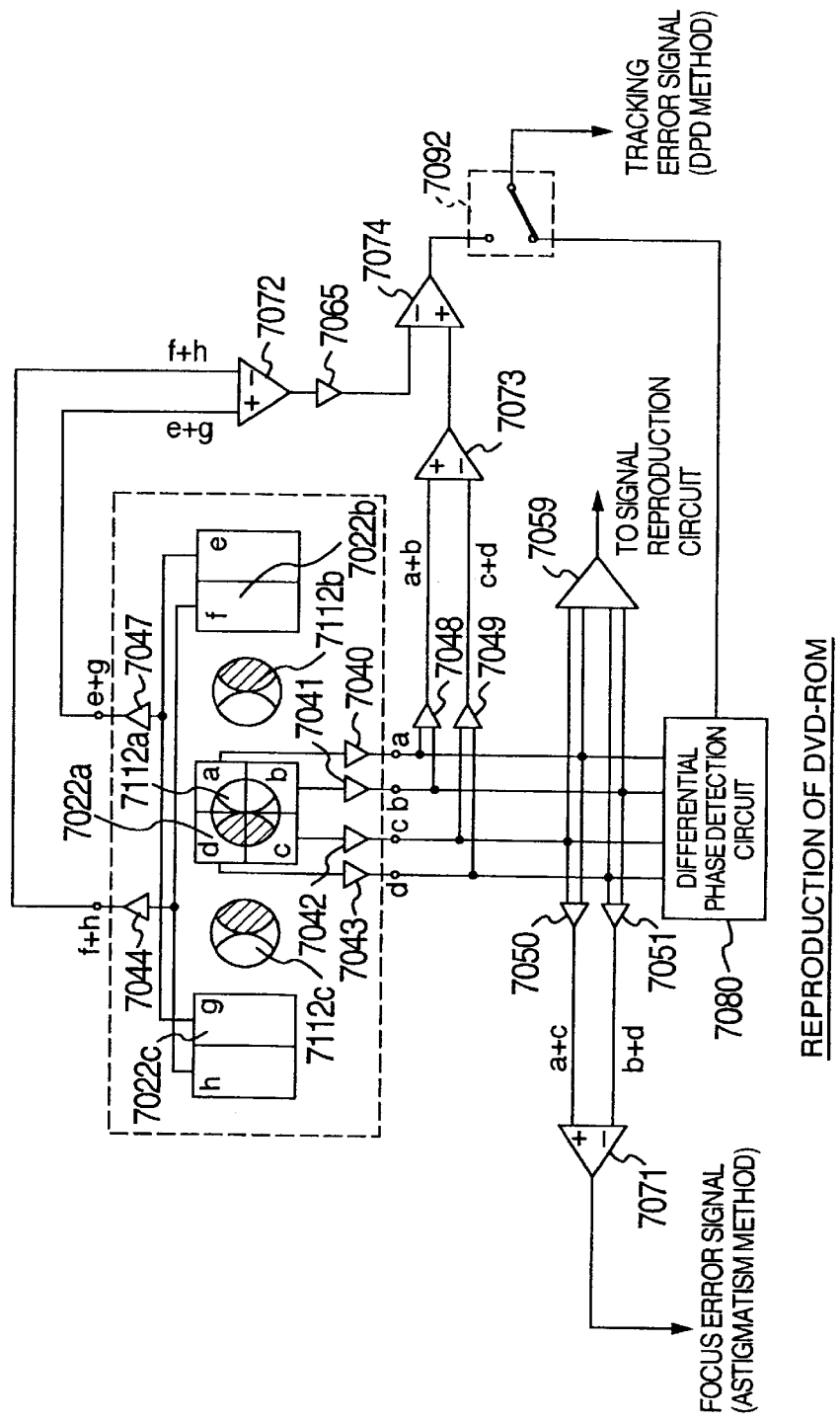
FIG. 34 is a schematic diagram of a signal processing circuit used for DVD-ROM reproduction according to the ninth embodiment.

The ninth embodiment of the invention has the same structure as that of the optical pickup of the seventh embodiments, excepting the light reception plane pattern of light reception areas. As shown in FIGS. 33A and 33B, the light reception plane pattern of light reception areas has eight independent light reception planes disposed linearly, including one light reception area divided into four light reception planes in a 田-character shape and two light reception areas each divided into two light reception planes. With this light reception plane pattern of light reception areas, the number of light reception planes can be reduced. With such an optical detector, as a method of detecting a focus error signal and a tracking error signal, the detection methods described with the seventh embodiment can be used and so the detailed description thereof is omitted. In reproducing a DVD-ROM disc, a calculation circuit shown in FIG. 34 is used. A focus error signal is detected by the astigmatism method and a tracking error signal is detected by the differential phase detection method (DPD method). In FIG. 34, reference numeral 7065 represents an amplifier having a gain factor K3, reference numeral 7047 represents a subtractor, and reference numeral 7092 represents a turnover switch.

Figure 35:
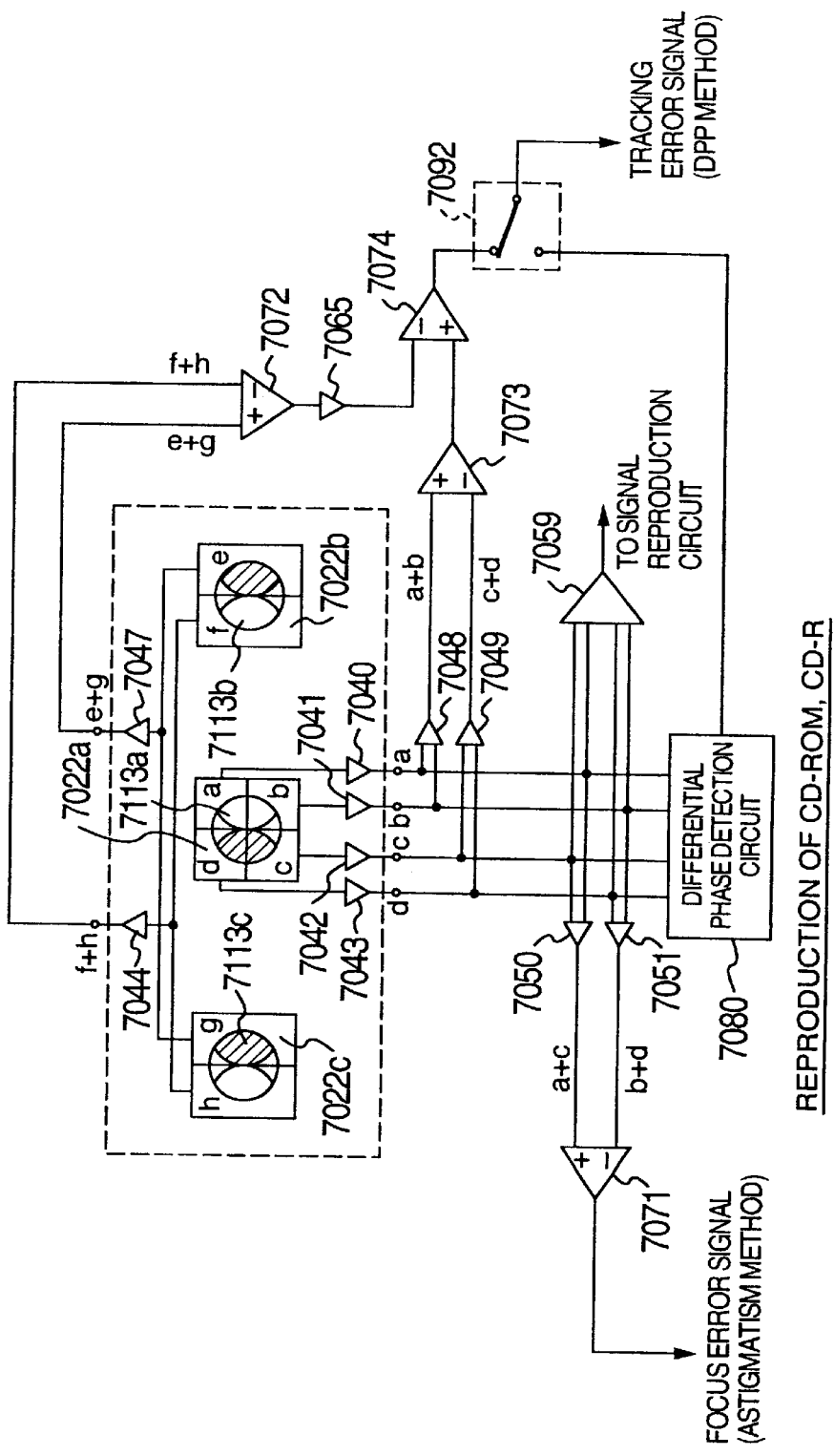
FIG. 35 is a schematic diagram of a signal processing circuit used for CD-ROM or CD-R reproduction according to the ninth embodiment.

In reproducing a CD-series disc such as CD-ROM and CD-R, a calculation circuit shown in FIG. 35 is used. A focus error signal is detected by the astigmatism method and a tracking error signal is detected by the differential push-pull method (DPP method).

Another embodiment will be described which uses a simplified light reception plane pattern of light reception areas.

The tenth embodiment of the invention has the same structure as that of the optical pickup of the seventh embodiments, excepting the light reception plane pattern of light reception areas. As shown in FIGS. 36A and 36B, the light reception plane pattern of light reception areas has six independent light reception planes disposed linearly, including one light reception area divided into four light reception planes in a 田-character shape and two light reception areas each having one light reception plane disposed on both sides of the one light reception area.

Figure 37:
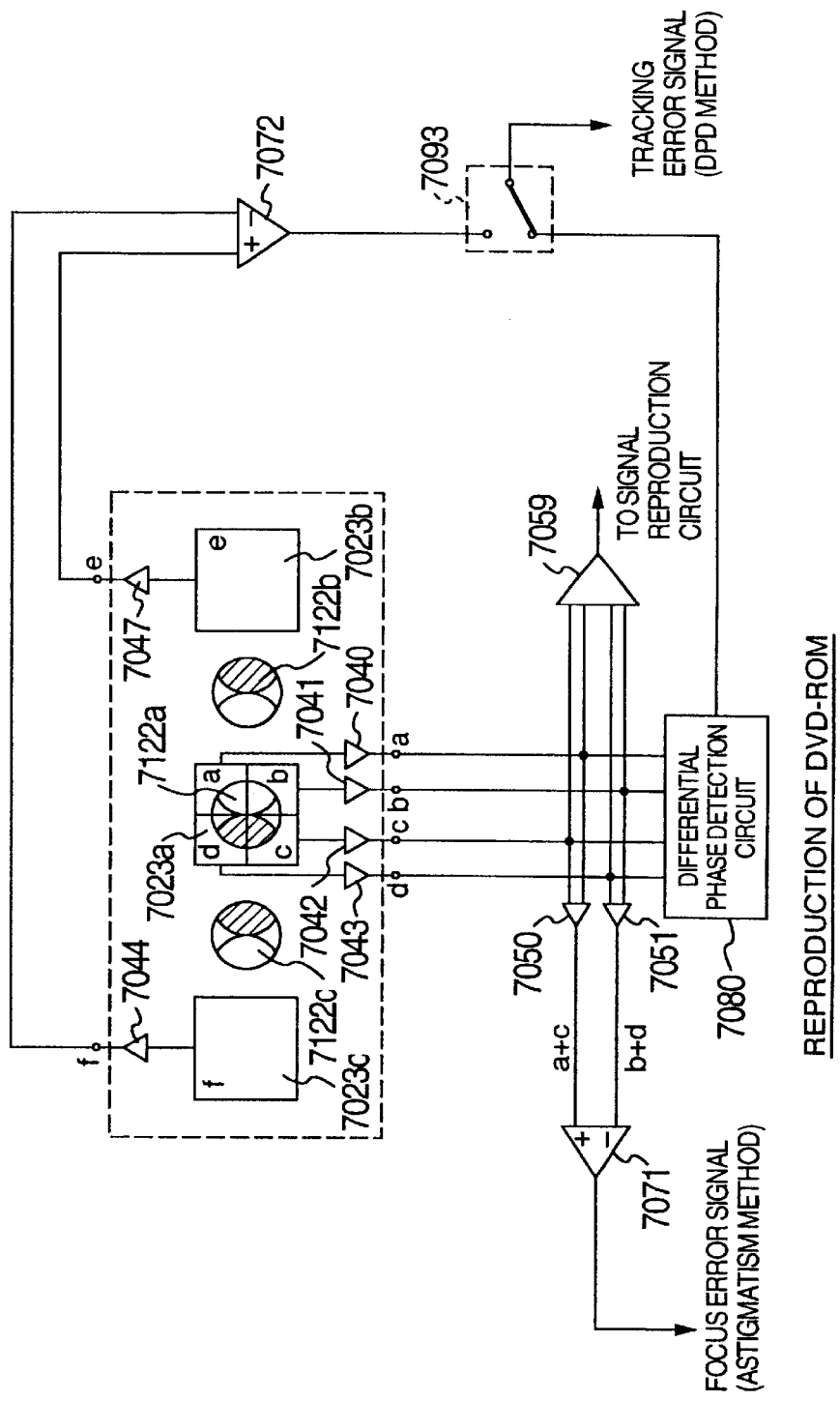
FIG. 37 is a schematic diagram of a signal processing circuit used for DVD-ROM reproduction according to the tenth embodiment.
Figure 38:
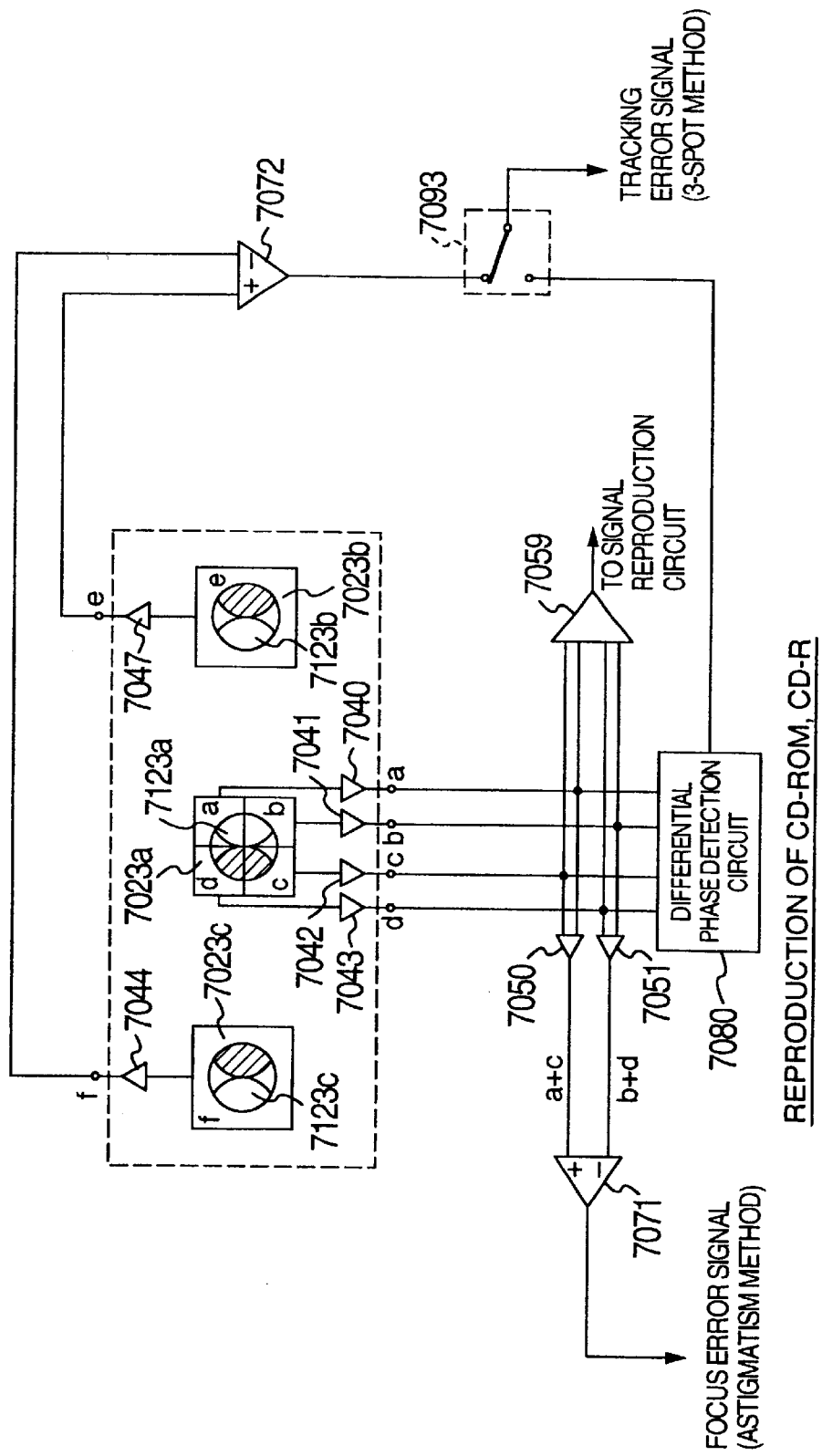
FIG. 38 is a schematic diagram of a signal processing circuit used for CD-ROM or CD-R reproduction according to the tenth embodiment.

In FIGS. 36A and 36B, reference numerals 7122*a*, 7122*b* and 7122*c* represent light spots of three light beams diffracted and separated by the three-spot diffraction grating 7009, reflected by the optical disc 7008 and converged on the light reception areas of the optical detector 7002 during reproducing a DVD-series disc. Reference numerals 7123*a*, 7123*b* and 7123*c* represent light spots of three light beams diffracted and separated by the three-spot diffraction grating 7009, reflected by the optical disc 7008 and converged on the light reception areas of the optical detector 7002 during reproducing a CD-series disc. The three-spot diffraction grating 7009 has a function of diffracting and separating a light beam in the 780 nm wavelength band radiated from the second semiconductor laser source described earlier and forming three spots on the optical disc 7008 such as CD-ROM and CD-R at a spot distance of about 0.4 $\mu$m in the disc radial direction, the spot distance corresponding to a quarter of the track pitch of information tracks. As a method of detecting a focus error signal and a tracking error signal with such an optical pickup, the focus error signal is detected by the astigmatism method and the tracking error signal is detected by the differential phase detection method (DPD method) by using a calculation circuit shown in FIG. 37. In FIG. 37, reference numeral 7093 represents a turnover switch. In reproducing a CD-series disc such as CD-ROM and CD-R, a calculation circuit shown in FIG. 38 is used. A focus error signal is detected by the astigmatism method and a tracking error signal is detected by the three-spot method.

In the ninth and tenth embodiments, the light beam in the 650 nm wavelength band is not necessarily required to be diffracted and separated by the three-spot diffraction grating 7009. Therefore, the diffraction efficiency of the light beam in the 650 nm wavelength band may be set to almost 0% by controlling the groove depth of the three-spot diffraction grating 7009.

In the seventh to tenth embodiments, by moving the hologram element 7010 along the optical axis direction and rotating it around the optical axis, the converged position of the + first-order diffracted light beam (or − first-order diffracted light) on the optical detector 7002 can be displaced without changing the converged position of the 0-order light beam passed straight through the hologram element 7010 on the optical detector 7002. It is therefore possible to adjust the relative position between the light reception area in the optical detector 7002 and a light spot incident upon the light reception area so that a focus error signal and a tracking error signal can be output correctly.

Figure 39A:
FIG. 39A is a schematic diagram showing a diffraction grating having slanted side walls.
Figure 39B:
FIG. 39B is a schematic diagram showing a diffraction grating having stepped side walls.

As described earlier, by using the sawtooth grating of the hologram element 7010 to selectively improve the diffraction efficiency of a light beam necessary for signal detection, a high light use efficiency of light fluxes used for signal detection can be obtained, and it is possible to reduce as much as possible a possibility that stray light components of light unnecessary for signal detection become incident upon the light reception area and lower the signal detection S/N ratio. In order to realize the sawtooth of the hologram element 7010 of the embodiments, a diffraction grating having either slanted side walls or stepped side walls as shown in FIGS. 39A and 39B is used. If the diffraction efficiency of the hologram element 7010 has a wavelength or polarization dependency, the light use efficiency of a signal light beam can be improved further.

A diffraction grating with a wavelength dependent diffraction efficiency will be described.

Figure 40:
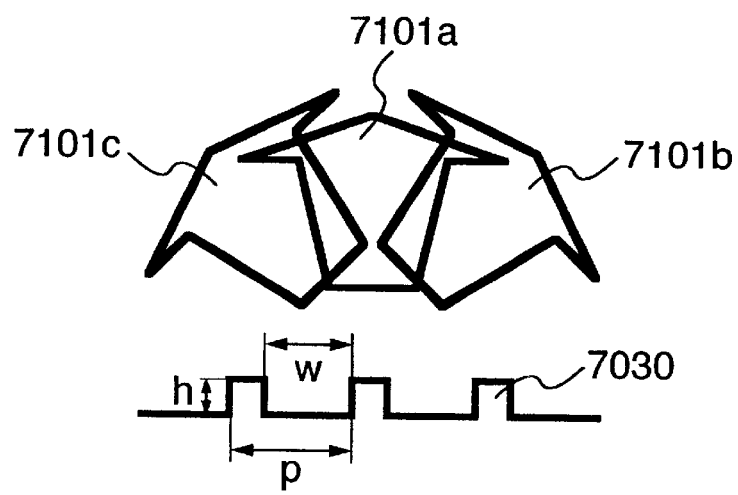
FIG. 40 is a schematic diagram illustrating light diffraction by a diffraction grating having a cross section of a rectangular grating groove.

Generally, in case of a diffraction grating having a rectangular grating groove cross section, as shown in FIG. 40, when the diffracting grating 30 is defined that w is a grating groove width, p is a grating period, h is a grating groove depth, a light intensity I0 of 0-order light 7101a and a light intensity I1 of + first-order light 7101b (− first-order light) are considerably dependent upon w, p and h and represented by the equations (2):

$$I_0 = 1 + 2\beta(\beta-1)(1-\cos\alpha)$$

$$I_1 = (2/\pi^2)\sin^2(\pi\beta)(1-\cos\alpha)$$

$$\alpha = (2\pi/\lambda)(n-1)h$$

$$\beta = w/p \qquad (2)$$

where the light intensity of incidence light is 1, n is a refractive index of a transparent member 7030 in which diffraction grating is engraved, and λ is a wavelength of a light beam incident upon the diffraction grating. It can be understood from the equations (2) that the grating groove depth is set so as to satisfy the following formulas (3) and (4):

$$(n-1)h \cong m \cdot 650 \text{ [nm]} \quad (m: \text{ an optional positive integer}) \qquad (3)$$

$$(n-1)h \cong (k-0.5) \cdot 780 \text{ [nm]} \quad (k: \text{ an optional positive integer}) \qquad (4)$$

If the formula (3) is satisfied, incidence light in the 650 nm band can generate the 0-order diffracted light as much as possible, whereas if the formula (4) is satisfied, incidence light in the 780 nm band can generate the first-order diffracted light as much as possible.

For example, if the grating groove depth is set to (n−1)h=1950 [nm], then (n−1)h=3·650=2.5·780 and both the formulas (3) and (4) are satisfied, the light use efficiency can therefore be improved.

The hologram element having the wavelength dependency or wavelength selectivity is not limited only to the element realized by controlling the grating groove depth as described above, but other elements basing upon any principle may also be used so long as they provide a sufficiently high diffraction efficiency of the ± first-order diffracted light for the light in the 780 nm band, and of the 0-order light for the light in the 650 nm band.

Figure 41:
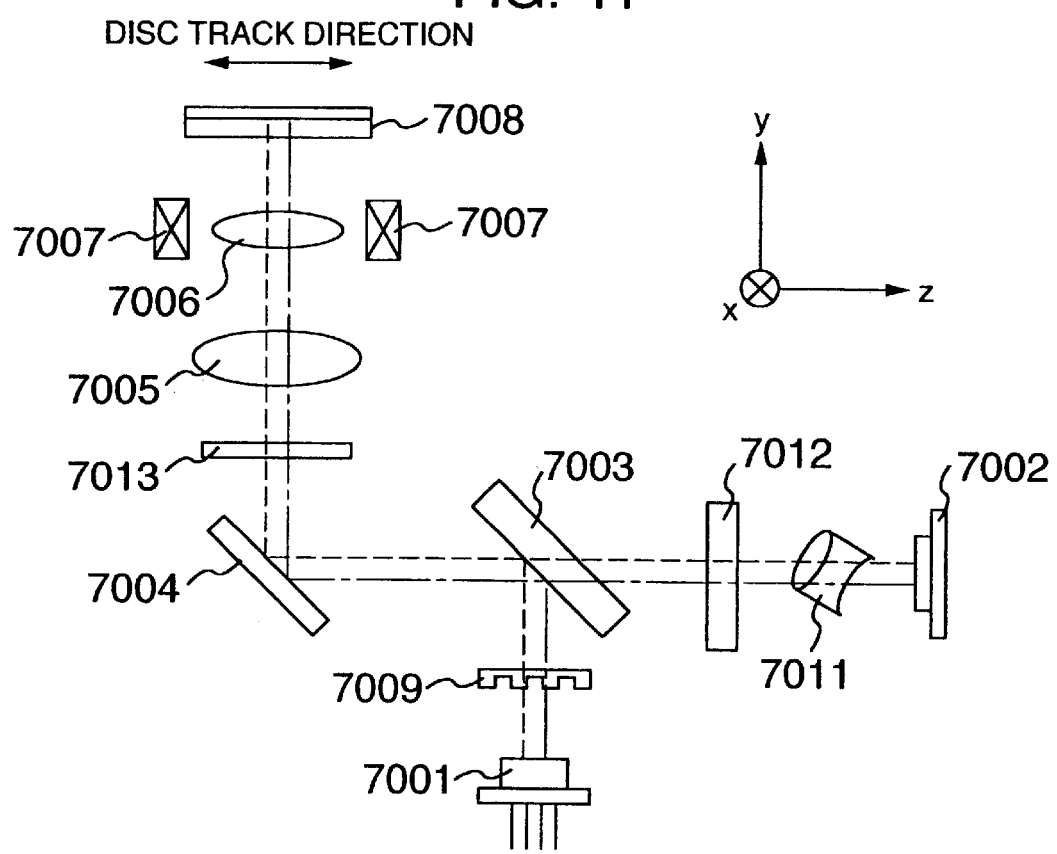
FIG. 41 is a schematic diagram showing the structure of an optical pickup according to an eleventh embodiment of the invention.

The eleventh embodiment of the invention will be described. In the eleventh embodiment, a light use efficiency of signal detection light is improved by using a polarizing element with a polarization dependent diffraction efficiency. FIG. 41 is a schematic diagram showing the structure of an optical pickup according to the eleventh embodiment of the invention. In FIG. 41, like elements to those of the seventh embodiment shown in FIGS. 24A, 24B and 24C are represented by using identical reference numerals. As different from the seventh embodiment, in this embodiment, a polarization dependent hologram 7012 is used in place of the hologram element 7010 and combined with a polarizer element 7013 to thereby improve a light use efficiency by utilizing polarization.

As the polarizer element 7013, a wave plate is used which functions as a 5/4λ plate for a light beam in the 650 nm band. The polarization dependent hologram 7012 diffracts only light fluxes, e.g., light fluxes having S polarization, at a predetermined diffraction efficiency, and transmits the light fluxes having P polarization orthogonal to S polarization.

In reproducing a high density optical disc such as DVD-ROM, a two-wavelength multi laser source 7001 radiates a light beam in the 650 nm wavelength band having S polarization. This light beam passes through a three-spot diffraction grating 7009. The diffracted light beams become incident upon a dichromatic half mirror 7003 disposed at an angle of 45° relative to the optical axis. The light beams reflected by the dichromatic half mirror 7003 become incident upon the polarizer element 7013 via a rising mirror 7004. Since the polarizer element 7013 functions as the 5/4 λ plate for the light beam in the 650 nm band, the incident light beams having S polarization change to light beams having circular polarization after they pass through the polarizer element 7013. These light beams are changed to parallel light fluxes by a collimator lens 7005 and reach an objective lens 7006. This objective lens 7006 is supported by an actuator 7007, and converges light beams on an optical disc 7008 such as DVD-ROM to form light spots. The light beams reflected from the optical disc 7008 propagate along a reversed optical path of the incoming optical path to become incident upon the polarizer element 7013 via the objective lens 7006 and collimator lens 7005. After the incident light beams having circular polarization pass through the polarizer element 7013, they become light beams having P polarization, pass through the dichromatic half mirror 7003 via the rising mirror 7004, and become incident upon the polarization dependent hologram 7012. Since the polarization dependent hologram 7012 has no diffraction function relative to a light beam having P polarization and functions as a mere transparent member, the light beams having P polarization incident upon the polarization dependent hologram 7012 are not diffracted but pass straight therethrough and reach predetermined light reception areas of an optical detector 7002 via a detection lens 7011.

In reproducing a conventional optical disc such as CD-ROM, the two-wavelength multi laser source 7001 radiates a light beam in the 780 nm wavelength band having S polarization. The light beam radiated from the two-wavelength multi laser source 7001 passes through the three-spot diffraction grating 7009. The diffracted light beams become incident upon the dichromatic half mirror 7003 disposed at an angle of 45° relative to the optical axis. The light beams reflected by the dichromatic half mirror 7003 become incident upon the polarizer element 7013 via the rising mirror 7004. Since the polarizer element 7013 functions as the 5/4 λ plate for the light beam in the 650 nm band as described previously, it functions as generally a λ plate for a light beam in the 780 nm wavelength band, and the incident light beams having S polarization continues to be the light beams having S polarization even after they pass through the polarizer element 7013. These light beams are changed to parallel light fluxes by the collimator lens 7005 and reach the objective lens 7006. This objective lens 7006 is supported by the actuator 7007, and has the function of converging light beams on a DVD disc as described earlier and converging light beams on the optical disc 7008 such as CD-ROM, to thereby form light spots. The light beams reflected from the optical disc 7008 propagate along a reversed optical path of the incoming optical path to become incident upon the polarizer element 7013 via the objective lens 7006 and collimator lens 7005. Even after the incident light beams having circular polarization pass through the polarizer element 7013, they maintain having S polarization, pass through the dichromatic half mirror 7003 via the rising mirror 7004, and become incident upon the polarization dependent hologram 7012. Since the polarization dependent hologram 7012 has a diffraction function relative to a light beam having S polarization, the light beams are diffracted at predetermined diffraction efficiencies by the polarization dependent hologram 7012, and reach predetermined light reception areas of the optical detector 7002 different from the predetermined positions for the light beams in the 650 nm wavelength band. With the embodiment arrangement, only light fluxes necessary for signal detection during reproduction of both DVD and CD can be efficiently guided to the optical detector. It is therefore possible to considerably improve the light use efficiency and remove unnecessary stray light components.

The positional relation between light spots and light reception planes in light reception areas of the optical detector 7002, and a method of detecting information signals, a focus error signal and a tracking error signal during reproduction, are similar to those of the seventh embodiment.

Similar to the seventh embodiment, by moving the polarization dependent hologram 7012 along the optical axis direction and rotating it around the optical axis, the focus positions and light reception plane positions of light beams 7112a, 7112b and 7112c in the 780 nm band detected by the optical detector 7002 can be changed independently without changing the focus positions and light reception plane positions of light beams 7113a, 7113b and 7132c in the 650 nm band detected by the optical detector 7002. Therefore, the detector adjustment and focus error signal offset adjustment can be performed independently for the 650 nm band light beams and 780 nm band light beams.

The light use efficiency can be improved further if the dichromatic half mirror 7003 is made to have a function of totally reflecting a 650 nm light beam having S polarization, transmitting a 650 nm light beam having P polarization almost 100%, and reflecting and transmitting a 780 nm light beam having S polarization both by about 50%.

In the embodiments described above, although the hologram element 7010 is positioned between the half mirror 7003 and detection lens 7011, the invention is not limited only to this position, but it may be positioned at the optical path between the detection lens 7011 and optical detector 7002. Also in the above-described embodiments, the hologram element 7010 has the function of guiding the 0-order light beam in the 650 nm wavelength band and the + or − first-order light beam in the 780 nm wavelength band, to predetermined positions of the optical detector 7002. Obviously, the invention is not limited only thereto. For example, conversely, a diffraction grating may be used which has a function of guiding the + or − first-order light beam in the 650 nm wavelength band and the 0-order light beam in the 780 nm wavelength band, to predetermined positions of the optical detector 7002.

Figure 42:
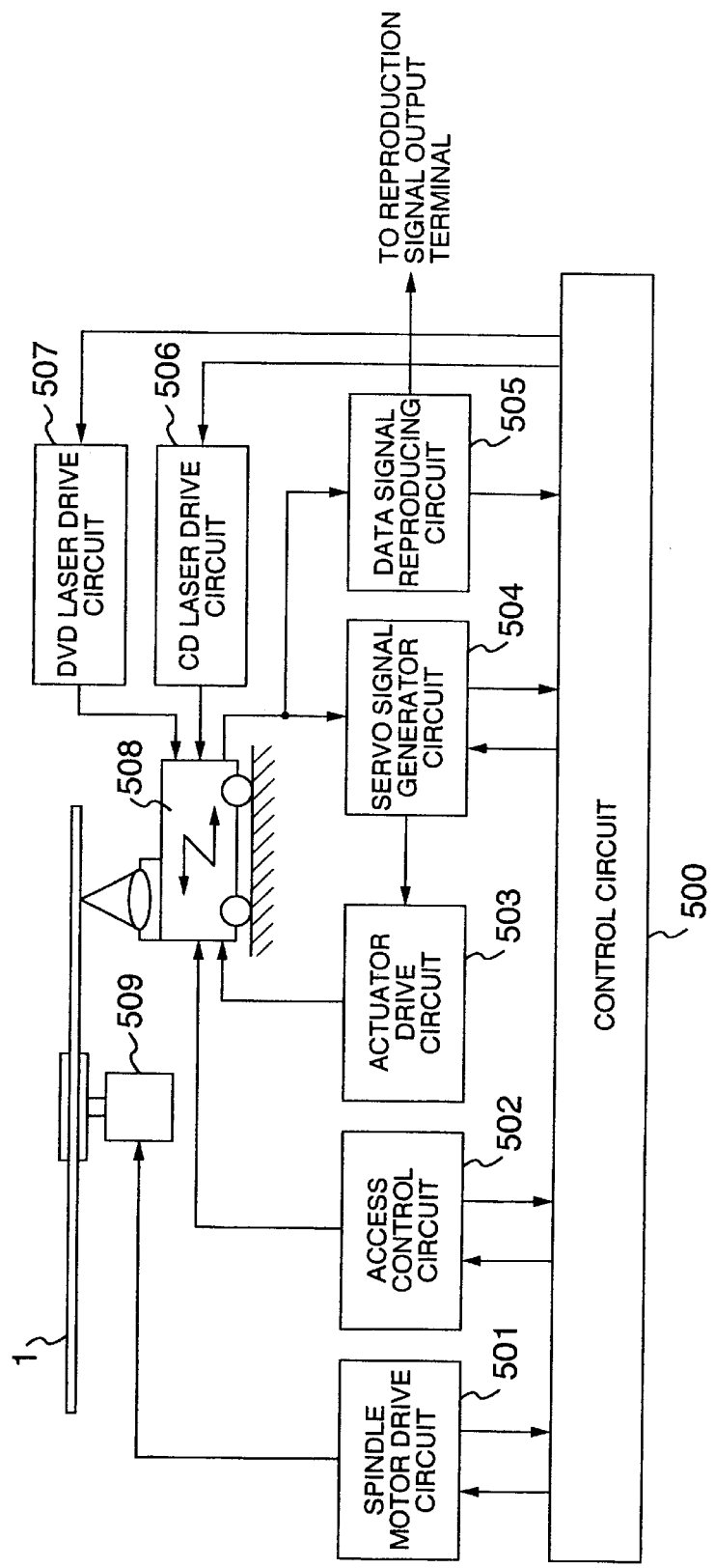
FIG. 42 is a schematic block diagram showing an optical disc drive equipped with an optical pickup of the invention.

FIG. 42 is a schematic block diagram showing an optical disc drive equipped with an optical pickup of this invention. For example, an optical pickup 508 is housed in the package 20 shown in FIG. 9 and equipped with the optical pickup shown in FIGS. 24A, 24B and 24C and FIG. 41. Various signals detected by the optical pickup 508 are supplied to a servo signal generator circuit 504 and a data signal reproducing circuit 505 in the signal processing circuit. The servo signal generator circuit 504 generates a focus error signal and a tracking error signal suitable for each optical disc, from the supplied detection signals. In accordance with these error signals, an actuator drive circuit 503 drives an objective lens actuator in the optical pickup 508 to adjust the position of the objective lens. The data signal reproducing circuit 505 reproduces data signals recorded in the optical disc 1 from the supplied detection signals. Portions of the signals generated and reproduced by the servo signal generator circuit 504 and data signal reproducing circuit 505 are supplied to a control circuit 500. In accordance with these signals, the control circuit 500 identifies the type of the optical disc to be reproduced. In accordance with the identification result, the control circuit 500 drives either a DVD laser drive circuit 507 or a CD laser drive circuit 506, and switches the circuit structure of the servo signal generator circuit 504 to select the servo signal detection method matching the type of each disc, as described earlier. An access control circuit 502 and a spindle motor drive circuit 501 are connected to the control circuit 500, the former controlling the access direction and position of the optical pickup 508 and the latter controlling a spindle motor 509 for the optical disc.

As the optical detector, a photodiode or other types of photodetectors may be used.

The invention is not limited only to the above-described embodiments, but various modifications not departing from the scope of claims are intended to be included in this invention.

What is claimed is:

1. An optical detector for detecting at least three light beams separated from a light beam emitted from a first laser source, a second laser source or both, applied to a first or second optical information recording medium and reflected from the optical information recording medium, the optical detector comprising:

a first light reception area having four divided light reception planes where a light beam reflected from the first optical information recording medium is applied;

a second light reception area having four divided light reception planes where a light beam reflected from the second optical information recording medium is applied; and a third light reception area and a fourth light reception area each having four divided light reception planes where a light beam reflected from the first optical information recording medium is applied, wherein a signal is output which can generate a focus error signal by an astigmatism method by using the first light reception area, second light reception area or both; or a signal is output which can generate a tracking error signal by a push-pull method by independently using the first light reception area, second light reception area or both; or a signal is output which can generate a tracking error signal by a differential phase detection method by using the first light reception area, second light reception area or both; or a signal is output which can generate a focus error signal by the astigmatism method by independently using the third light reception area, fourth light reception area or both; or a signal is output which can generate a tracking error signal by the push-pull method by independently using the third light reception area, fourth light reception area or both, further comprising:

a fifth light reception area and a sixth light reception area each having two divided light reception planes where a light beam reflected from the second optical information recording medium is applied, wherein a signal is output which can generate a tracking error signal by the push-pull method by independently using the fifth light reception area, sixth light reception area or both.

2. An optical pickup comprising:

a semiconductor laser having a first laser source, a second laser source or both;

a light separation element for separating a light beam emitted from the first laser source, a second laser source or both into at least three light beams;

a converging optical system for applying a light beam including the three light beams to a first or second optical information recording medium; and an optical detector recited in claim 1 for detecting the light beams reflected from the optical information recording medium.

3. An optical information reproducing apparatus comprising:

an optical pickup recited in claim 2 for detecting a signal supplied from the optical information recording medium;

a servo signal generator circuit for generating a focus error signal or a tracking error signal from detection signals detected with the optical pickup;

an actuator drive circuit for controlling a position of an objective lens actuator of the optical pickup in accordance with the focus error signal or tracking error signal;

an information signal reproducing circuit for reproducing an information signal recorded in the optical information recording medium, by using the detection signals;

an access control circuit for controlling an access direction and position of the optical pickup; and a spindle motor drive circuit for rotating the optical information recording medium.

4. An optical detector for detecting at least three light beams separated from a light beam emitted from a first laser source, a second laser source or both, applied to a first or second optical information recording medium and reflected from the optical information recording medium, the optical detector comprising:

a first light reception area having four divided light reception planes where a light beam reflected from the first optical information recording medium is applied;

a second light reception area having four divided light reception planes where a light beam reflected from the second optical information recording medium is applied; and a third light reception area and a fourth light reception area each having four divided light reception planes where a light beam reflected from the first optical information recording medium is applied, wherein a signal is output which can generate a focus error signal by an astigmatism method by using the first light reception area, second light reception area or both; or a signal is output which can generate a tracking error signal by a push-pull method by independently using the first light reception area, second light reception area or both; or a signal is output which can generate a tracking error signal by a differential phase detection method by using the first light reception area, second light reception area or both; or a signal is output which can generate a focus error signal by the astigmatism method by independently using the third light reception area, fourth light reception area or both; or a signal is output which can generate a tracking error signal by the push-pull method by independently using the third light reception area, fourth light reception area or both, further comprising:

a fifth light reception area and a sixth light reception area each having four divided light reception planes where a light beam reflected from the second optical information recording medium is applied, wherein: a signal is output which can generate a focus error signal by the astigmatism method by independently using the fifth light reception area, sixth light reception area or both; or a signal is output which can generate a tracking error signal by the push-pull method by independently using the fifth light reception area, sixth light reception area or both.

5. An optical pickup comprising:

a semiconductor laser having a first laser source, a second laser source or both;

a light separation element for separating a light beam emitted from the first laser source, a second laser source or both into at least three light beams;

a converging optical system for applying a light beam including the three light beams to a first or second optical information recording medium; and an optical detector recited in claim 4 for detecting the light beams reflected from the optical information recording medium.

6. An optical information reproducing apparatus comprising:

an optical pickup recited in claim 5 for detecting a signal supplied from the optical information recording medium;

a servo signal generator circuit for generating a focus error signal or a tracking error signal from detection signals detected with the optical pickup;

an actuator drive circuit for controlling a position of an objective lens actuator of the optical pickup in accordance with the focus error signal or tracking error signal;

an information signal reproducing circuit for reproducing an information signal recorded in the optical information recording medium, by using the detection signals;

an access control circuit for controlling an access direction and position of the optical pickup; and a spindle motor drive circuit for rotating the optical information recording medium.

7. An optical detector according to any one of claim 1 or 4, wherein:

of a plurality of light spots applied to each of the first and second optical information recording media, at least one set of light spots has a space therebetween in a track vertical direction equal to about a half a track pitch of each of the first and second optical information recording media; and a ratio between track pitches of the first and second optical information recording media is generally equal to a ratio between wavelengths of the first and second laser sources.

* * * * *